US012572965B1

(12) United States Patent
Solorzano et al.

(10) Patent No.: US 12,572,965 B1
(45) Date of Patent: Mar. 10, 2026

(54) ITEM CATALOG GENERATION BASED ON DOCUMENT IMPORTATION

(71) Applicant: Block, Inc., San Francisco, CA (US)

(72) Inventors: Daniel Bulhosa Solorzano, Half Moon Bay, CA (US); Man Wai Winnie Yeung, Sunnyvale, CA (US)

(73) Assignee: Block, Inc., Oakland, CA (US)

( * ) Notice: Subject to any disclaimer, the term of this patent is extended or adjusted under 35 U.S.C. 154(b) by 354 days.

(21) Appl. No.: 17/985,663

(22) Filed: Nov. 11, 2022

(51) Int. Cl.
| | |
|---|---|
| *G06Q 30/00* | (2023.01) |
| *G06Q 30/0601* | (2023.01) |
| *G06V 30/40* | (2022.01) |

(52) U.S. Cl.
CPC ..... *G06Q 30/0603* (2013.01); *G06Q 30/0643* (2013.01); *G06V 30/40* (2022.01)

(58) Field of Classification Search
CPC ............... G06Q 30/00; G06Q 30/0603; G06Q 30/0643; G06V 30/40
USPC ...................................................... 705/26, 27
See application file for complete search history.

(56) References Cited

U.S. PATENT DOCUMENTS

| | | | | |
|---|---|---|---|---|
| 11,263,285 B2 * | 3/2022 | Butt | ...................... | G06F 16/972 |
| 2007/0118438 A1 * | 5/2007 | Long | ...................... | G06Q 50/12 |
| | | | | 705/26.8 |

| | | | | |
|---|---|---|---|---|
| 2015/0128076 A1 * | 5/2015 | Fang | ..................... | G06F 3/0482 |
| | | | | 715/765 |
| 2019/0065613 A1 * | 2/2019 | Bilsten | ................... | G06F 16/986 |
| 2019/0065614 A1 * | 2/2019 | Bilsten | ................... | G06Q 10/10 |
| 2019/0073348 A1 * | 3/2019 | Cheesman | ........... | G06V 30/412 |
| 2023/0106967 A1 * | 4/2023 | Aggarwal | ........... | G06V 30/416 |
| | | | | 382/225 |

OTHER PUBLICATIONS

Ghai et al., "Zomato Digitizes Menus Using Amazon Textract and Amazon SageMaker," Oct. 27, 2020, Artificial Intelligence, 26pgs. (Year: 2020).*

* cited by examiner

*Primary Examiner* — Robert M Pond
(74) *Attorney, Agent, or Firm* — Lee & Hayes, P.C.

(57) ABSTRACT

Described herein are systems and techniques for generating a digital document from an original document. In some embodiments, such techniques may involve receiving the original document associated with a user, identifying one or more object categories within the original document, wherein the object categories are grouped based on items depicted in the original document, extracting one or more data values associated with the items depicted in the original document from the one or more object categories, generating document data as a digital version of the original document based on the one or more data values associated with the items depicted in the original document, and presenting the document data to at least one user device.

20 Claims, 16 Drawing Sheets

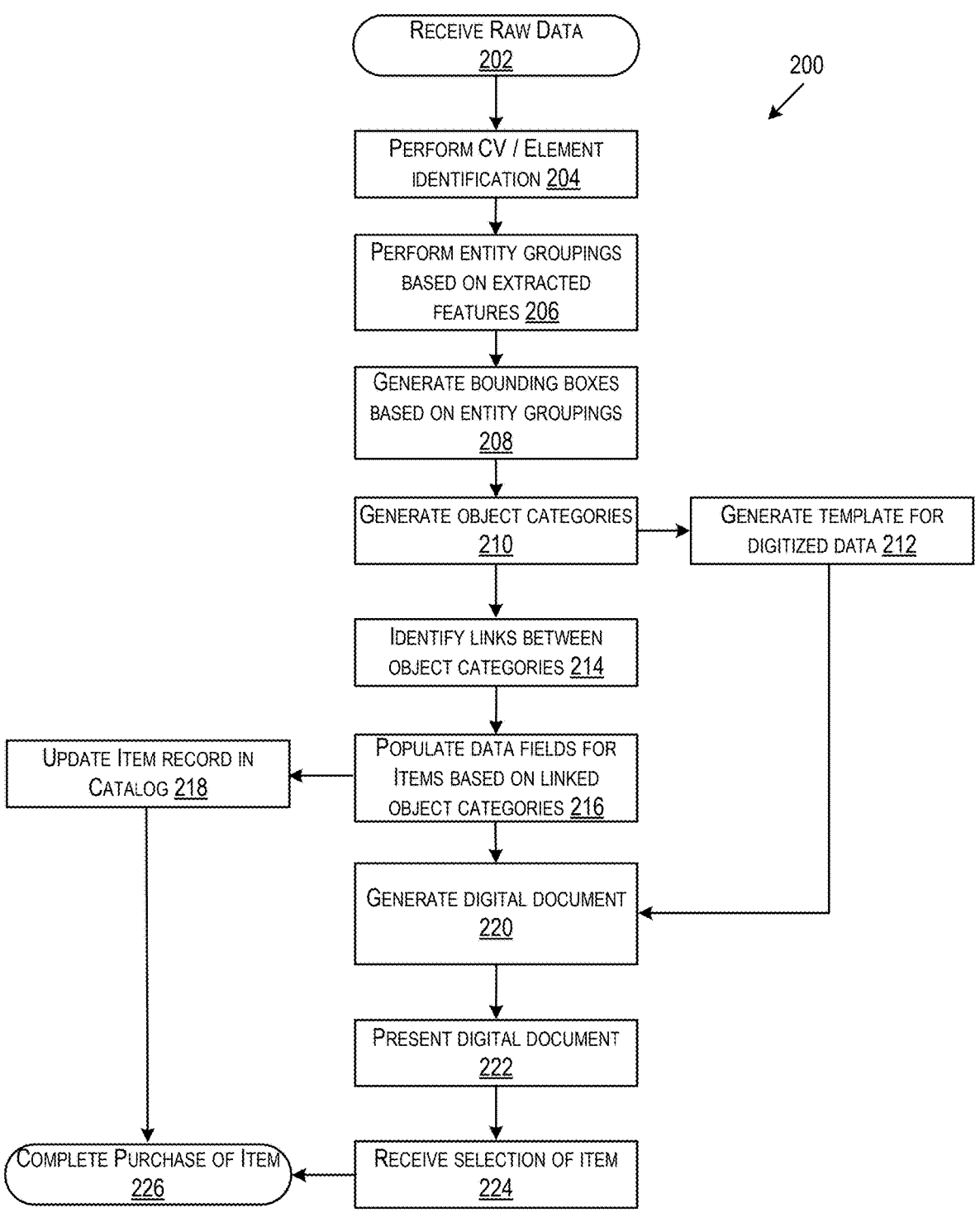

200

RECEIVE RAW DATA
202

PERFORM CV / ELEMENT
IDENTIFICATION 204

PERFORM ENTITY GROUPINGS
BASED ON EXTRACTED
FEATURES 206

GENERATE BOUNDING BOXES
BASED ON ENTITY GROUPINGS
208

GENERATE OBJECT CATEGORIES
210

GENERATE TEMPLATE FOR
DIGITIZED DATA 212

IDENTIFY LINKS BETWEEN
OBJECT CATEGORIES 214

UPDATE ITEM RECORD IN
CATALOG 218

POPULATE DATA FIELDS FOR
ITEMS BASED ON LINKED
OBJECT CATEGORIES 216

GENERATE DIGITAL DOCUMENT
220

PRESENT DIGITAL DOCUMENT
222

COMPLETE PURCHASE OF ITEM
226

RECEIVE SELECTION OF ITEM
224

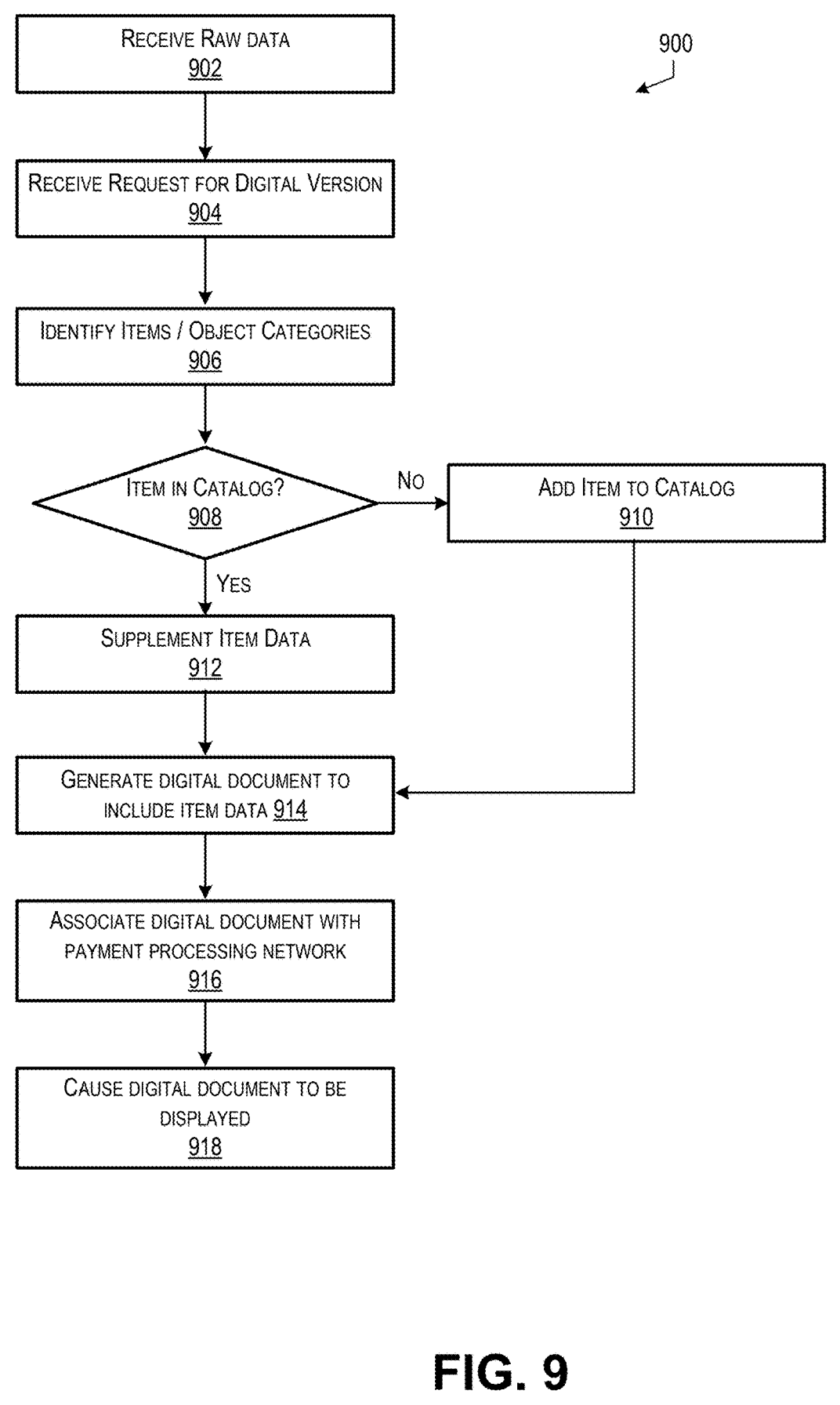

```
┌─────────────────────────────┐
│     RECEIVE RAW DATA         │
│           902                │
└─────────────────────────────┘
              │
              ▼
┌─────────────────────────────┐
│ RECEIVE REQUEST FOR DIGITAL VERSION │
│           904                │
└─────────────────────────────┘
              │
              ▼
┌─────────────────────────────┐
│ IDENTIFY ITEMS / OBJECT CATEGORIES │
│           906                │
└─────────────────────────────┘
              │
              ▼
        ◇ ITEM IN CATALOG? ◇ ──── NO ──→ ┌──────────────────────┐
        ◇     908        ◇               │  ADD ITEM TO CATALOG │
              │                          │         910          │
             YES                         └──────────────────────┘
              ▼                                    │
┌─────────────────────────────┐                   │
│     SUPPLEMENT ITEM DATA     │                   │
│           912                │                   │
└─────────────────────────────┘                   │
              │                                    │
              ▼                                    │
┌─────────────────────────────┐ ◄─────────────────┘
│  GENERATE DIGITAL DOCUMENT TO │
│  INCLUDE ITEM DATA 914        │
└─────────────────────────────┘
              │
              ▼
┌─────────────────────────────┐
│ ASSOCIATE DIGITAL DOCUMENT WITH │
│ PAYMENT PROCESSING NETWORK    │
│           916                │
└─────────────────────────────┘
              │
              ▼
┌─────────────────────────────┐
│  CAUSE DIGITAL DOCUMENT TO BE │
│         DISPLAYED            │
│           918                │
└─────────────────────────────┘
```

FIG. 9

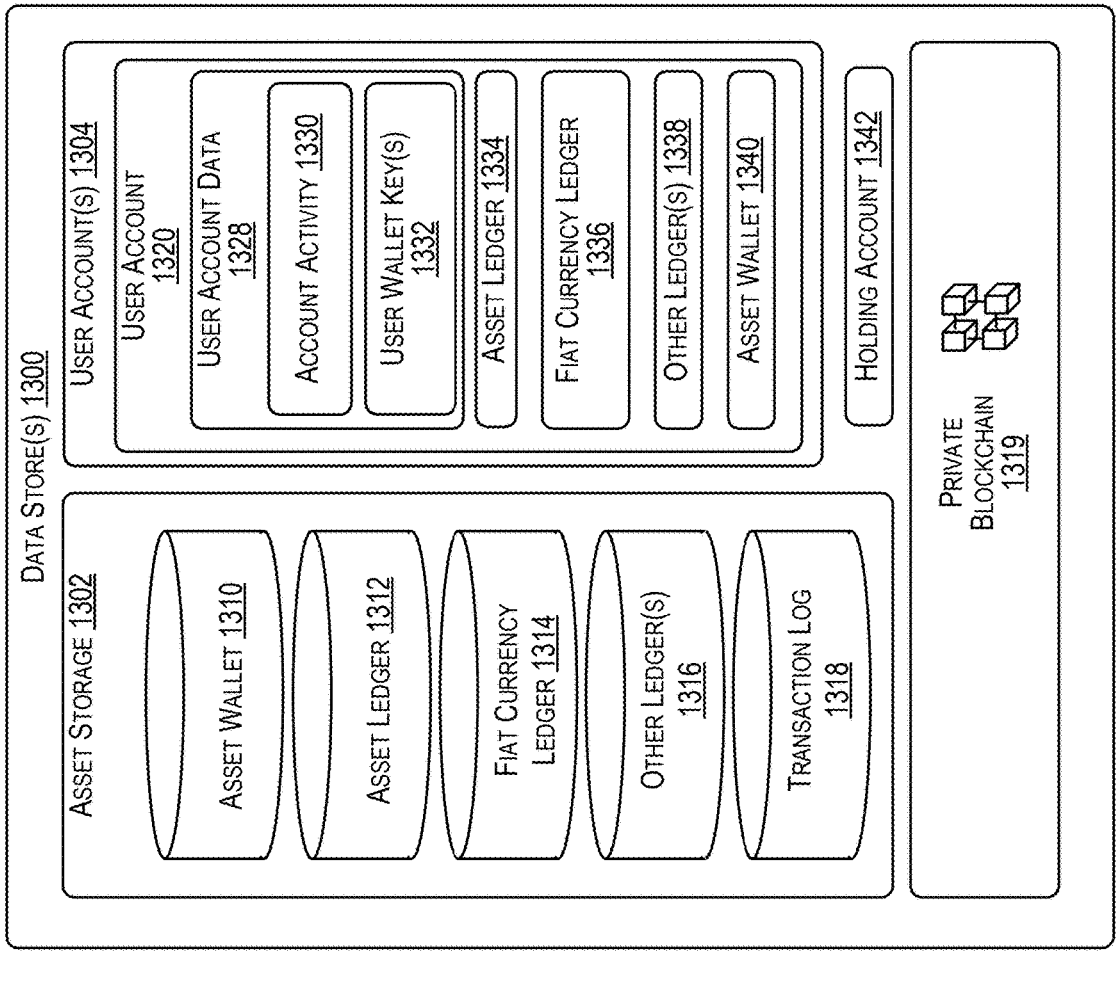
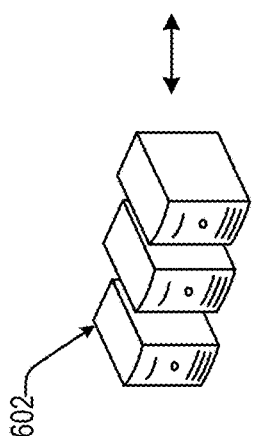
FIG. 13

1600
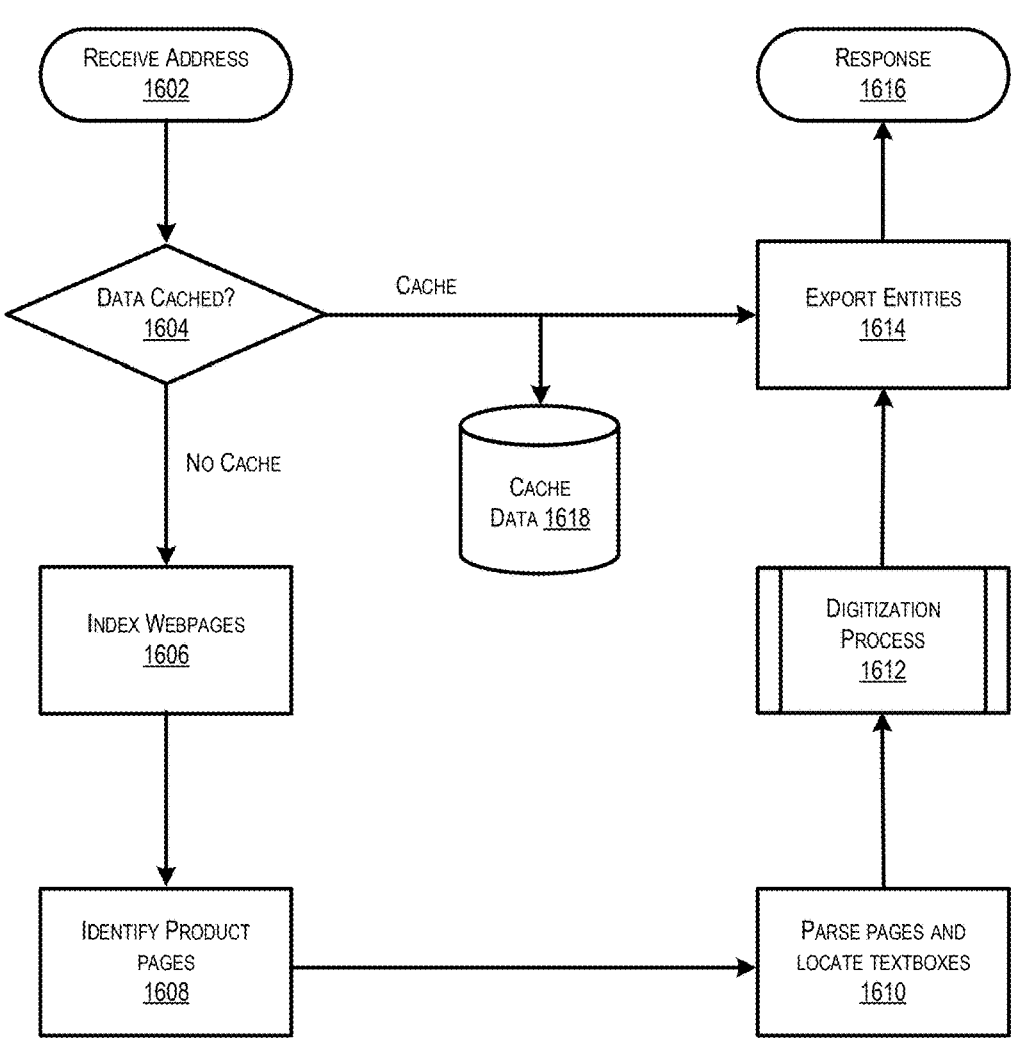
FIG. 16

ITEM CATALOG GENERATION BASED ON DOCUMENT IMPORTATION

BACKGROUND

Now, more than ever, maintaining an online or digital presence is paramount to running a successful business. This is true even for businesses that have traditionally required a presence at a physical location, such as restaurants or other brick and mortar businesses. However, the creation of a digital or online presence can be complicated, which prevents a number of business operators from participating in the digital economy.

BRIEF DESCRIPTION OF THE DRAWINGS

Features of the present disclosure, its nature and various advantages, will be more apparent upon consideration of the following detailed description, taken in conjunction with the accompanying drawings. In the figures, the leftmost digit(s) of a reference number identifies the figure in which the reference number first appears. The use of the same reference numbers in different figures indicates similar or identical items or features. The drawings are not to scale.

FIG. 2 is a block diagram illustrating an example process 200 for facilitating the completion of a purchase based on a received original document, according to an embodiment described herein.

FIG. 9 is a flow chart that illustrates a process for generating a digital document by identifying supplemental data for the item according to an embodiment described herein.

FIG. 13 is an example of data store(s) that can be associated with servers of the payment service, according to an embodiment described herein.

FIG. 16 is a flow chart that illustrates a process for generating a first digital document from an original document according to an embodiment described herein.

DETAILED DESCRIPTION

Figure 1:
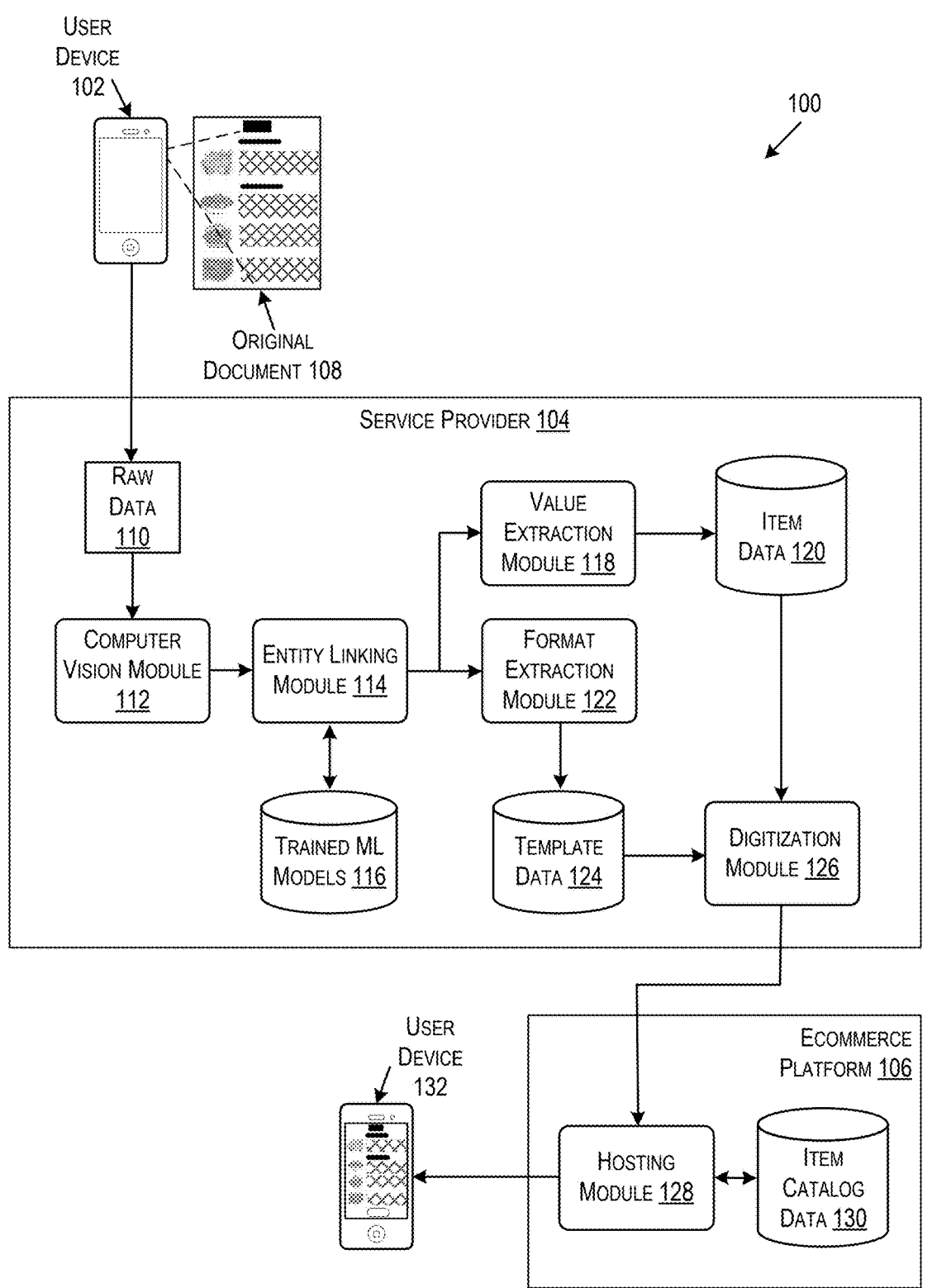
FIG. 1 is an example environment 100 for generating a digital version of an original document, according to an embodiment described herein.

Described herein are techniques for facilitating the generation of a digital (e.g., interactive) document from an original document (e.g., a file in an image format or portable document format (PDF) document). The techniques described herein relate to methods for digitizing raw data for the original document in a manner that enables interaction between a user and one or more items depicted in that data. The digitization takes information that might be immutable and allows the generation of interaction with that information. The techniques described herein include the ability to take raw data representing at least one item within an original document (such as a PDF of an item menu) or an image of a physical item menu and generates therefrom a digital version of the item menu with embedded functionality for utilizing the item menu in association with an ecommerce platform. Traditionally, generation of a digital item menu may require at least some experience with computing platforms and software that enables a user to manually input items and item attributes until enough data was received to generate the digital item menu. The present techniques described herein may improve upon these traditional techniques by allowing a merchant to simply select a file representing the item menu, take a picture of a physical item menu, or provide a universal resource location (URL) of an item menu to generate a fully functional digital item menu that is integrated into an ecommerce website. To do so, several types of image data analysis may be utilized, including optical character recognition, natural language understanding techniques, computer vision, etc. These techniques may be utilized to generate, from the image data of the physical item menu, item menu categories that are linked together and can be utilized to generate a menu data object representing the digital item menu.

In embodiments, raw data for an original document is processed to identify a number of elements. An element may be any suitable character (e.g., characters, symbols, images, etc.). The identified elements may be grouped into entities based on similarities between those elements and bounding boxes may be generated for the grouped entities. Information about the entities and bounding boxes can be used to generate entity labels to be associated with respective grouped entities, creating object categories. The object categories may be grouped and linked to items identified within the original document. Information obtained from the object categories is then used to generate a digital version of the original document. Interactive elements may also be added to the digital version of the original document to allow for interaction with that data (e.g., to complete a transaction).

Once a digital version of the original document has been generated, it may be provided to one or more users who may use the digital document to complete a transaction. For example, a digital version of a restaurant's menu may be generated from an image captured of a physical version of the menu. The digital version of the menu may include elements that allow a user to select one or more items to be purchased from the restaurant. In some cases, the digital document is associated with a payment processing network, which is configured to facilitate a transaction initiated via the digital document.

Embodiments of the disclosed system provide for a number of advantages over conventional systems. Many businesses rely upon the distribution of data via business documents (e.g., catalogs, menus, etc.). Textual information is often presented within a 2D structure of the documents. In such documents, the layout, positioning, and sizing of textual information might be as crucial to understanding its context and/or semantic content as the text itself. While some systems may use natural language processing (NLP) techniques to determine context of presented textual data, it is worth noting that such techniques fall short. NLP techniques address the task of processing and understanding natural language texts through subtasks like language modeling, classification, information extraction, summarization, translation, and question answering among others. NLP techniques typically operate on serialized text, which is a 1D sequence of characters. Such methods have been proven very successful for various tasks on unformatted text (e.g., books, reviews, news articles, short text snippets). However, when processing structured and formatted documents in which the relation between words is impacted not only by the sequential order, but also by the document layout, the use of NLP techniques, by themselves, can result in significant shortcomings. For example, shortcomings may include text in different columns being erroneously recognized as a single column with multiple spaces in between text of the two columns. Another example may be that text, that while it would be recognized as being separate based on context, may be mis-associated when taken out of that context.

Additionally, the generation and training of machine learning models to, among other things, determine item categories and associate those categories with portions of an item menu are described. The use of specifically trained machine learning models grounds some of the techniques described herein in a computer-centric environment and produces results that offer improvements over conventional technologies. These improvements may include, for example, time sensitive generation of menu data objects. The models may be trained again and again over time, each time learning new parameters or updating parameter weighting to make the results of those models more accurate, timelier, etc.

In addition to the generation of a digital item menu, the present innovations describe a process for integrating the digital item menu with an existing ecommerce platform and the specific merchant account at issue such that the digital item menu is displayable to potential customers without any additional input from the merchant. This integration includes utilizing embeddings to make the items of the item menu selectable to cause a user interface associated with the menu data object to change dynamically and on the fly such items are selected. The integration also includes associating the menu items with payment functionality such that customers can purchase the items and the payment processing system described herein can be utilized to facilitate the transfer of funds from customer accounts to the merchant account and can facilitate real-time updates to merchant inventory amongst other attributes based on user interaction with the digital item menu.

Furthermore, the generation of digital item menus with integrated functionality as described herein may be performed by querying or otherwise "crawling" websites or other available resources to identify item menus or other information that may be utilized for generating item menu data objects that may be utilized on an ecommerce platform. The crawling may include querying and receiving data representing a given website and parsing that data to determine which portion is associated with an item menu. Once parsed, the data may be utilized to generate item menu data objects as described herein. By so doing, initial generation of digital item menus may be streamlined, or the item menu data objects may be updated automatically when the scraped data from the websites indicates a change on the item menu from when the item menu data object was generated.

FIG. 1 is an example environment 100 for generating a digital version of an original document, according to an embodiment described herein. The environment 100 of FIG. 1 may include at least a user device 102 and a service provider 104. In some embodiments, the environment 100 may further include an ecommerce platform 106 or other computing device for hosting web content.

The user device 102 may include any suitable device capable of receiving information to be digitized and/or input from a user. For example, such suitable devices may include a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The user device 102 may be configured to present output to a user via one or more output devices (e.g., a display, speakers, etc.) as well as to receive input from a user via one or more input devices (e.g., microphone, touchscreen, buttons, etc.). In some embodiments, the user device 102 may include a camera capable of capturing image data. In these embodiments, the user device 102 may be used to capture an image of an original document 108 and provide that image to the service provider 104 as raw data 110. The raw data 110 may be any suitable representation of the original document 108. For example, the raw data 110 may be an image or other immutable representation of the original document. In another example, the raw data 110 may include a URL or other location at which the original document 108 is stored.

The service provider 104 may include one or more host computing devices that may be used to implement the functionality described herein according to some implementations. The service provider 104 may be hosted on one or more servers or other types of computing devices that may be embodied in any number of ways. For instance, in the case of a server, the service provider 104 may be implemented on a single server, a cluster of servers, a server farm or data center, a cloud hosted computing service, and so forth, although other computer architectures (e.g., a mainframe architecture) may also be used. Further, to the extent that the figures illustrate the components of the service provider 104 as being present in a single location, it is to be appreciated that these components may be distributed across different computing devices and locations in any manner.

Generally, the service provider 104 may be implemented by one or more computing devices, with the various functionality described herein distributed in various ways across the different computing devices. The computing devices may be located together or separately, and organized, for example, as virtual servers, server banks and/or server farms. The described functionality may be provided by the servers of a single party or enterprise or may be provided by the servers and/or services of multiple parties or enterprises.

The service provider 104 may implement a number of software components capable of carrying out the various functions as depicted herein. The service provider 104 may receive raw data 110 from which a digital document is to be generated. In some embodiments, the raw data 110 may be an image (e.g., an image of an original document 108) or other immutable document, such as a PDF. In embodiments, the raw data 110 may include textual information arranged in a structured format.

In embodiments, the raw data 110 is provided to a computer vision module 112. The computer vision module 112 may use one or more computer vision techniques to identify a number of object representations throughout the raw data 110. Such an object representation may be any representation of a character or item depicted within the raw data. Examples of computer vision techniques that may be used to identify objects include optical character recognition (OCR) or other methods of object recognition. Using the computer vision techniques, the computer vision module 112 may be configured to identify individual text characters throughout the raw data. In some cases, the computer vision module 112 may be further configured to determine characteristics of the characters, such as a font style, font size, and/or font color associated with the character. Additionally, locations may be determined in relation to each identified character within the raw data. In some cases, a bounding box may be created for each identified character that contains that character. In some cases, a bounding box may be defined as a location of a point in the bounding box (e.g., the top leftmost corner) and a height and width of the bounding box.

Once a number of objects (e.g., characters) have been identified within the raw data 110, some of those objects may be grouped to form entities (e.g., words, phrases, sentences, etc.). An entity linking module 114 may receive information about each of the identified objects within the raw data and may determine a number of entity groupings based on that information. In embodiments, the objects may be grouped into an entity based on proximity in locations of each of the objects, a style common to those objects, or any other detected similarities between the objects. In embodiments, bounding boxes may be generated to contain each entity formed in this manner. In some embodiments, the information about the detected/grouped objects is provided to a trained machine learning (ML) models 116 in order to generate one or more entity labels to be applied to each entity (grouping of objects). An entity that has been assigned an entity label may be referred to as an object category. An entity label may include any suitable indication of an object category represented by an entity associated with that entity label. For example, an entity label may be a name (or title), a description, a price, a type, or any other suitable category. Each entity label is associated with an entity by virtue of being associated with a bounding box identified for that entity.

Once entity labels, as determined by the trained ML model 116, have been applied to each of the determined entities (e.g., object categories have been created), a number of entities may be linked to one or more items. An item may be a representation of a physical or virtual item that is offered for sale by a merchant. In some embodiments, entities may be linked to an item based on a recurring pattern of entities having the same, or a similar, entity label assigned to them. Each of these recurring entities may be linked to a separate item by virtue of its recurrence. In embodiments, other entities in proximity to an entity linked with an item may also be linked to that same item by virtue of its relative position to the entity linked to the item.

In embodiments, each entity linked to an item may be mapped to a data field maintained in relation to that item based on the entity label assigned to that entity. In some cases, entities may be used to populate the data fields for the item by a value extraction module 118. To do this, text/character information associated with each entity may be converted into a data value and populated into the respective data field. This may be repeated for each of a number of items to form item data 120 that includes populated data fields for each of the items determined to be related to the raw data 110.

In some embodiments, a 2-dimensional (2D) structure may be extracted from the raw data via a format extraction module 122. In embodiments, information about a location of each of the entities in the raw data may be stored as a template in template data 124. In embodiments, the template data may further include information about a style of the text associated with each of the entities. The template data 124 may include position and style information of each item represented in the raw data.

Once the service provider 104 has extracted item data 120 and template data 124 from the raw data 110, a digitization module 126 may use that data to generate a digital version of the original document 108. To do this, the digitization module 126 may generate a document having the data values stored in the item data 120 mapped to corresponding locations within the template data 124. In embodiments, the data values may be presented at the corresponding locations using a style or format associated with one or more entities based on the template data 124. In embodiments, the digital version of the original document may be updated to reflect any changes made to the data values stored in relation to the item data 120. Once a digital version of the original document has been generated, that digital version may be provided to at least one second computing device.

In some embodiments, the digital version of the original document is provided to an ecommerce platform to be used in completing one or more electronic transactions. The ecommerce platform 106 may include one or more host computing devices that may be used to facilitate electronic transactions. In some embodiments, the ecommerce platform may be configured to relay information (e.g., payment information) to a payment processor in order to complete a transaction on behalf of a merchant associated with the original document. In some embodiments, the ecommerce platform 106 may include a hosting module 128 configured to provide web hosting capabilities and/or backend application support. Additionally, the ecommerce platform 106 may store the item data 120 as item catalog data 130 that includes information about one or more items (e.g., items offered for sale by one or more merchants). In embodiments, the ecommerce platform 106 may use the item catalog data 130 to generate a storefront that a user can browse through using the user device 132 to purchase items.

In embodiments, the hosting module 128 may be configured to provide the digital version of the original document to at least one second user device 132. A user of the second user device may be capable of interacting with one or more elements of the digital version of the original document via a user interface presented on the user device 132. In some implementations, the digital version of the document may appear similar to the original document 108. For example, the hosting module 128 may generate the digital version to include similar fonts, colors, layouts, etc.

In some implementations, the digital version of the original document may appear dissimilar to the document but may include information from the item catalog data 130 that was stored based on the item data 120 extracted by the service provider 104. For example, the template data 124 may not be generated and the digital version of the original document may include different fonts, colors, layouts but may include items with title, descriptions, prices, and type categories as shown in the original document 108.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

As will be recognized, some of the figures disclosed herein are used to illustrate various processes. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 11-15, although the processes may be implemented in a wide variety of other environments, architectures and systems.

FIG. 2 is a block diagram illustrating an example process 200 for facilitating the completion of a purchase based on a received original document, according to an embodiment described herein. The process 200 may be performed by a service provider, such as the service provider 104 as described in relation to FIG. 1 above.

At 202, the process 200 involves receiving raw data related to an original document to be converted into a digital (e.g., interactive) document. In some embodiments, the raw data may include an image captured of the original document, such as a menu or catalog page. In some embodiments, the raw data may include some form of document, such as a PDF. In at least some of these embodiments, a provided original document may be an immutable document that is unable to be updated. In some embodiments, the raw data may be a website, such as an online electronic commerce storefront maintained by a merchant or other suitable user. Such website data may be received from a web crawler or other automated document scraper.

In some embodiments, a request is received from a user to generate a digital document to be associated with that user. In some cases, the user may request a digital document that provides ecommerce functionality by facilitating sales of one or more items offered by the user. In some cases, the user may provide the raw data along with the request. For example, the user may submit an image of a document to be converted into a digital document or submit a PDF file of a menu. In other cases, the system may, upon receiving the request from the user, retrieve the raw data associated with that user (e.g., scrape a website associated with the user, etc.) in order to complete the request.

At 204, the process 200 involves performing one or more computer vision (CV) techniques on the raw data to identify a number of elements within the raw data. For example, the imaging processing module 112 may identify the characters "$", "1" "4" "." "9" and "9" as elements included in a first region of the original document and the characters "S" "a" "1" "a" and "d" as elements included in a second region of the original document. An element may include any suitable character, symbol, image, group of characters, etc. It should be noted that different computer vision techniques may be used to identify and distinguish between different types of elements. For example, optical character recognition (OCR) techniques may be used to identify elements that include characters and/or textual information included within the raw data. In contrast, object recognition techniques may be used to identify elements that include image entities as well as to identify one or more objects within such images.

In addition to identifying a number of entities within the raw data, the process may further involve identifying features of those entities as well. For example, in addition to identifying a text character, an identification of various features of that text character may be identified. For example, a font style, font size, font color, location, and/or orientation/position may be determined for the identified text character.

At 206, the process 200 involves performing entity groupings based on the extracted features. Continuing with the example above, the entity linking module 114 may link each of the characters (e.g., elements) in the "$", "1" "4" "." "9" and "9" identified above into a "$14.99" string that is grouped as a single entity. In another example, the entity linking module 114 may link each of the characters in the "S" "a" "1" "a" and "d" identified above into a "Salad" string that is grouped as another single entity. In some embodiments, elements may be grouped into an entity (e.g., associated with each other) based on similarities in features detected for those elements. For example, elements representing individual text characters may be grouped into words and/or phrases based on similarities in characteristics (e.g., font style) and proximity. In another example, a first text character identified as being capitalized and a second text character identified as being punctuation (e.g., a period) may be used to group a number of individual elements representing text characters into an entity representing a sentence.

At 208, the process 200 involves generating bounding boxes based on the identified entity groupings. For example, the entity linking module 114 may generate a bounding box around the first entity of "$14.99" and the second entity of "Salad". In embodiments, bounding boxes may be generated such that they fully contain the entities assigned to a single group. A bounding box may be defined as a set of coordinates that correspond to a point in the bounding box (e.g., the top leftmost corner, center, etc.), as well as a height (H) and a width (W) of the bounding box.

At 210, the process 200 involves generating object categories from the identified and grouped entities. In embodiments, this may involve assigning to each of the entities and/or groups of entities, an entity label. For example, a module (e.g., the entity linking module 114) may be used to determine a first object category of price for the first entity of "$14.99". An entity label representing that object category of price is then associated with the first entity. In another example, the module may determine a second object category of item title for the second entity of "Salad." An entity label representing that object category of item title is then associated with the second entity. In some embodiments, entity labels may be determined for each of these entity groupings by a trained machine learning model (e.g., trained ML model 116). For example, a number of features of a number of entities (including characteristics of those entities and respective locations) may be provided to the trained machine learning model in order to output a number of entity labels to be assigned to each grouping of entities (bounding boxes). This is described in greater detail with respect to FIG. 4 below.

In some embodiments, the process 200 may involve generating a template for digitized data at 212. In some cases, this may be gone by the format extraction module 122 as described in relation to FIG. 1. Continuing with the example above, a first location of the first entity "14.99" within the original document as well as a second location of the second entity "Salad" within the original document may be preserved. This may involve mapping information about the bounding boxes identified at 208 to the template data. Information about the object categories may be stored in relation to that mapping of bounding boxes. It should be noted that object categories, as noted below with respect to 216, may correspond to data fields stored in item records. In some embodiments, characteristics associated with entities identified at 206 may be associated with bounding boxes in the template data.

At 214, the process 200 involves linking object categories to determined items (e.g., item groupings). Continuing with the example above, such a link may be created between the first entity "14.99" and the second entity "Salad". In embodiments, the object categories may be grouped in relation to, or otherwise associated with, one or more items associated with the raw data. In some cases, a number of items are identified as being included in the raw data by virtue of including a collection of object category types (as indicated by an assigned entity label). In some embodiments, object categories are associated with items based on their respective positions. For example, distinctions between object categories assigned to each item may be determined based on a split or difference in position between multiple object categories (e.g., recurring object categories) having the same or similar entity label. In embodiments, the object categories located between two object categories having the same entity label may be associated with one of those two object categories. In some embodiments, a determination may be made as what types of object categories may be included in each item, such that each of the items include a similar combination of object category types.

At 216, the process 200 involves (e.g., via a value extraction module 118) populating data fields for items based on linked object categories. In embodiments, each item may be associated with a number of data fields that store various details about those items. A mapping may be created between each object category and a corresponding data field in an item record. Information about the entities included in the object category are then used to determine data values to be populated into each of the respective data fields. Continuing with the example above, the data value associated with the first entity (e.g., "14.99") may be stored in a data field associated with price for an item. Additionally, the data value associated with the second entity (e.g., "Salad") may be stored in a data field associated with the item title for that same item. In some cases, the data values may be formatted or converted based on a type of data to be stored in a respective data field.

At 218, the process 200 involves generating or updating an item record in an item catalog. In some cases, an item catalog may be maintained on behalf of a user that submitted the request for the digital document. The item catalog may include information about a number of different items associated with (e.g., offered for sale by) that user. In the item catalog, each item may be associated with a database record that includes a number of data fields. The data fields in an item data record may be blank or null by default. However, as information about the item is determined at step 216, the database record for that item is updated to reflect the updated information. It should be noted that in cases in which an item record does not already exist for an item identified within the raw data, a new item data record may be generated and appended to the item catalog.

At 220, the process 200 involves generating a digital document (e.g., a digital version of an original document). In embodiments, the digital document may be generated in association with a user (e.g., the user that requested the digital document). In some cases, the digital document may be associated with a payment processing platform and an account (e.g., a financial account) maintained on behalf of that user.

In embodiments, a digital document may be generated by retrieving a template generated from the raw data (e.g., at 212) and populating that template with data values stored in relation to the items identified within the raw data. In some cases, the characteristics of the entities identified within the raw data may be applied to the data values populated into the templates. For example, a font style, font size, color, orientation, etc. of the original textual information may be applied to the data values populated into the template.

In some cases, one or more additional interactive elements may be added to the digital document that allow users to interact with the items depicted in the digital document. For example, an interactive element may be implemented within the digital document that allows a user to place an order for, or otherwise request access to, the item. In another example, an interactive element may be added to the digital document to cause a transaction to be completed.

At 222, the process 200 involves presenting the digital document to at least one user device. In some embodiments, a user submits a request for the document via his or her user device. For example, customer may use their smartphone to access a merchant's listing of items for sale after the merchant uses their desktop computer earlier to upload a PDF file of the merchant's menu. In another example, the user may select the digital document from a list of digital documents presented on the user device. In another example, a user device is used to access a website maintained by a merchant or other user. From that website, the user may request that the digital document be instantiated (presented) on the user device. By way of illustration, a user device may be used to visit a website maintained in relation to a restaurant. In this example, the user device may request, via that website, a copy of a digital version of the menu for that restaurant to be presented on the user device.

At 224, the process 200 involves receiving, from the user device, a selection of an item from the digital document. In some embodiments, selection of an item may be performed via one or more interactive elements implemented on the digital document. In some cases, the selection of an item may also include an indication of one or more characteristics or options associated with that selection. For example, in the scenario that the selection involves an article of clothing, size information may also be included in that selection. In another example, in the scenario that the selection involves a food item, information about a level of spice may also be included in that selection.

At 226, the process 200 involves completing a purchase of the selected item. In embodiments, the transaction is to be completed between a user that submitted the selection of the item from the digital document a user associated with the digital document. In embodiments, information about the transaction is provided to a payment processing network in order to initiate a transfer of funds between accounts associated with the respective users. Additionally, upon completion of the transaction, a notification may be provided to the user associated with the digital document.

In some implementations, the process 200 includes determining that an item includes multiple variations in the original document 108 and displaying an indication in the generated digital document that the item includes multiple variations. For example, the process 200 may include determining that a menu lists an item of "Pizza" with first variation of "Small" that is $10 and "Large" that is $16 and, based on that determination, generates the digital document to includes an entry for the item "Pizza" that saws "2 Prices" under a price field, where clicking on the "2 Prices" opens up a drop down list that shows a first selectable option of "Small $10" and a second selectable option of "Large $16."

Figure 3:
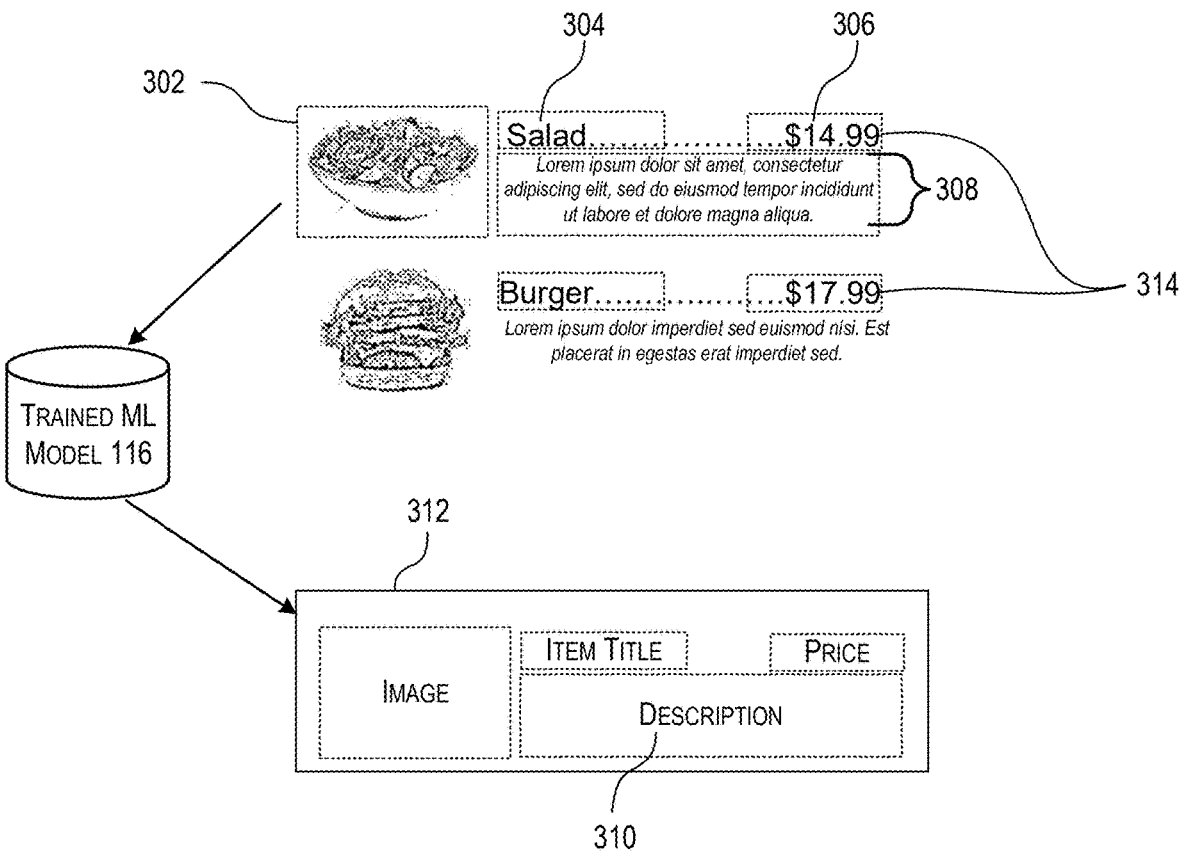
FIG. 3 depicts an example of techniques for identifying a number of entities within a document by determining logical groupings of data, according to an embodiment described herein.

FIG. 3 depicts an example of techniques for identifying a number of entities within a document by determining logical groupings of data, according to an embodiment described herein. The techniques illustrated with respect to FIG. 3 may be performed by a service provider, such as the service provider 104 as described in relation to FIG. 1 above. As noted elsewhere, the service provider may receive raw data 302, which may include a document depicting a representation of at least one item.

One or more computer vision techniques may be used to identify various elements and/or features within raw data. In some embodiments, the computer vision techniques may include optical character recognition (OCR) methods used to identify characters within the raw data that represent text. In some cases, one or more object recognition techniques may be used to identify objects depicted within an image 302 embedded in the raw data (e.g., within images included in the raw data).

In embodiments, the computer vision techniques may be used to detect characters, symbols, or other information included in the raw data. The computer vision techniques may also detect characteristics of that information. For example, the computer vision techniques may determine a font style, font size, font color, or location, and/or relative position of the characters within the raw data. In some embodiments, an object type or a category of an object depicted in an image 302 may be identified.

Once information has been identified within the raw data, various portions of that information may be grouped into one or more entities. For example, an entity 304 may include text characters determined to be included within a particular word or phrase may be identified by virtue of being on a single line and in close proximity. In some embodiments, a particular combination of text characters may be determined to be associated with an entity. For example, numeric data in combination with a symbol that represents a currency may be grouped together in a single entity 306. In some embodiments, characters or other information across multiple lines of text may be grouped into the same entity based on characteristics of that information. For example, multiple lines of text 308 may be grouped into an entity based on a similarity in proximity and font size/style.

Once a number of entities have been identified from the raw data, one or more of those entities may be linked to an item. In some embodiments, information about the one or more entities is provided as input to a trained ML model 116 to generate a number of entity labels to be assigned to each of the determined entities to create object categories 310. Once each of the entities have been assigned a label, the object categories 310 may be grouped in relation to, or otherwise associated with, one or more items 312 associated with the raw data. In some cases, a number of items are identified as being included in the raw data by virtue of including a collection of object category types (as indicated by entity label 310).

In some embodiments, object categories are associated with items based on their respective positions. For example, distinctions between object categories assigned to each item may be determined based on a split 314 or difference in position between multiple object categories (e.g., recurring object categories) having the same or similar entity label. In embodiments, the object categories located between two object categories having the same entity label may be associated with one of those two object categories. In some embodiments, a determination may be made as what types of object categories may be included in each item, such that each of the items include a similar combination of object category types.

Figure 4:
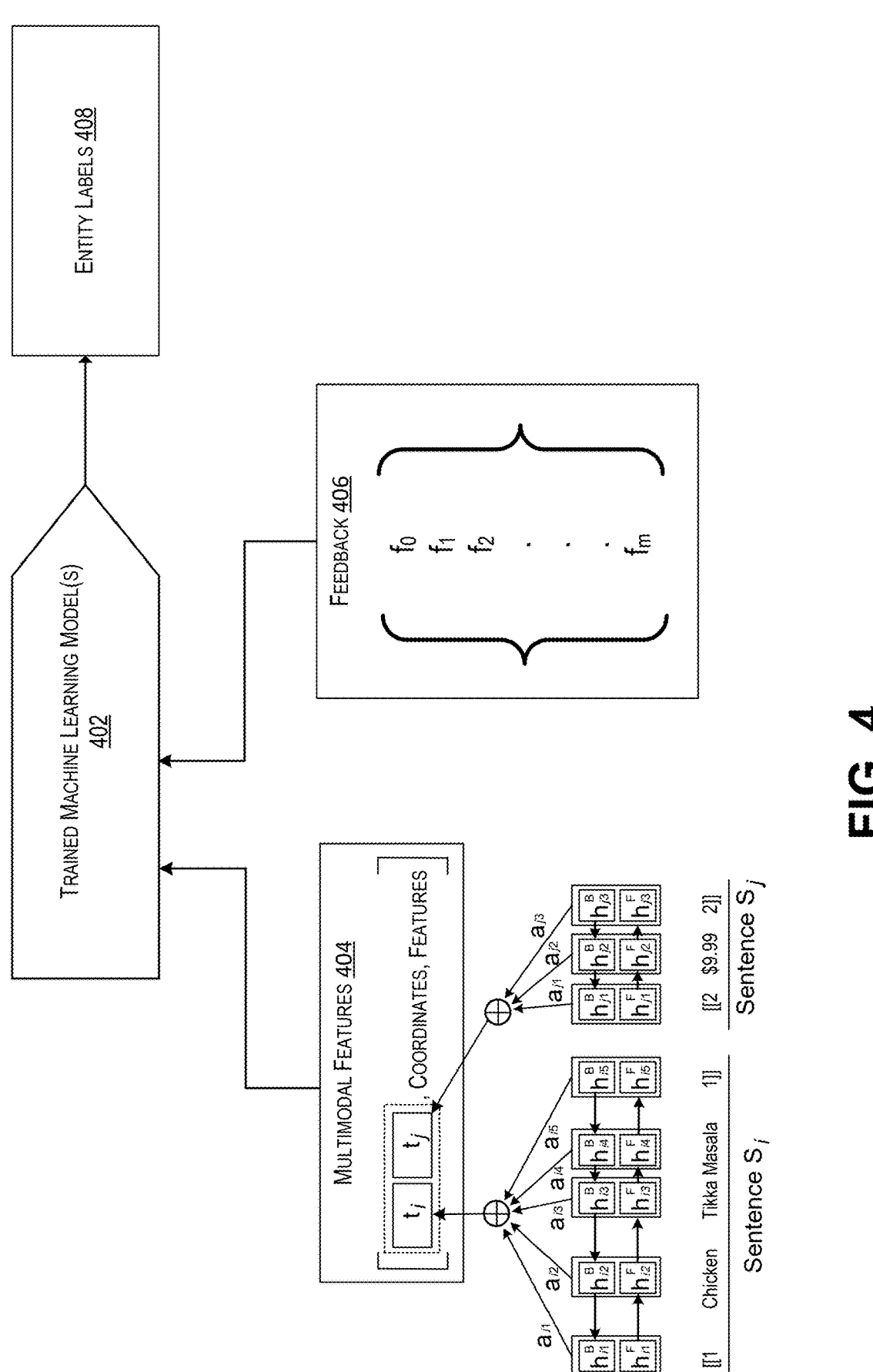
FIG. 4 is a conceptual diagram of an example of a trained machine learning model 402 that can be implemented to accept multimodal features 404 and feedback information 406 for generating entity labels 408 according to an embodiment described herein.

FIG. 4 is a conceptual diagram of an example of a trained machine learning model 402 that can be implemented to accept multimodal features 404 and feedback information 406 for generating entity labels 408 according to an embodiment described herein.

As described above, multimodal features 404 may include an indication of a number of entities (e.g., $t_i$, $t_j$), information about a location/position of those entities, and information about features of the entities (e.g., font type, font size, text color, etc.) as collected by a service provider. In embodiments, the number of entities ($t_i$, $t_j$) may include information about the entities identified within the raw data. In embodiments, the process involves creating a grid of character encodings (e.g., $$h\frac{B}{i1} - h\frac{F}{j3}$$

Such a grid can be constructed from character boxes, i.e., bounding boxes that each surround a single character somewhere on a given document page. This positional information can come from an optical character recognition (OCR) engine or can be directly extracted from the layout information in the document as provided by, e.g., PDF or HTML. The coordinate space of a character box can be defined by page height H and width W, and can be measured in units of pixels. Each of the character encodings can be generated from a number of detected character strings, such as sentences $S_i$ or $S_j$ as detected within the raw data.

In embodiments, the multimodal features 404 may be collected in association with a number of detected character strings, such as sentences $S_i$ or $S_j$ as located within the raw data. In such cases, the entities may be detected via one or more computer vision techniques as described elsewhere.

Based on the multimodal features 404 being provided to the trained machine learning model 402 as input, the trained machine learning model 402 may then output one or more entity labels 408, which may be an identification of a category or classification to be applied to one or more entities.

In addition to the multimodal features 404, feedback 406 may be further provided to the trained machine learning model 402. Like the multimodal features 404, the feedback 406 (e.g., $f_0$-$f_m$) may include representations of, or data values related to, the feedback, such as numbers, symbols, etc. The feedback 406 may also be collected in association with a particular entity or set of entities. In such cases, once an entity label 408 has been determined for an entity, or set of entities, by the trained machine learning model 402, feedback 406 may be provided that indicates whether the determined entity label 408 is correct. In some embodiments, the feedback 406 may further include an indication of a correct entity label 408.

Upon receiving the feedback 406, the trained machine learning model 402 may generate or update one or more variables or weights used to generate the entity label 408. It should be noted that the feedback 406 may be received at a different time than the multimodal features 404 are received. In some embodiments, as user feedback is received, it may be combined with any multimodal features 404 in order to generate a more holistic entity label 408. Such an entity label 408 may be updated as new feedback 406 is received. In some embodiments, multimodal features 404 and/or feedback 406 received within a predetermined period of time (e.g., within 30 minutes of the entity label 408 being generated) is used to generate the entity label 408. It should be noted that the use of multimodal features as input to a machine learning model as described herein result in more accurate entity label determination over conventional systems.

Figure 5:
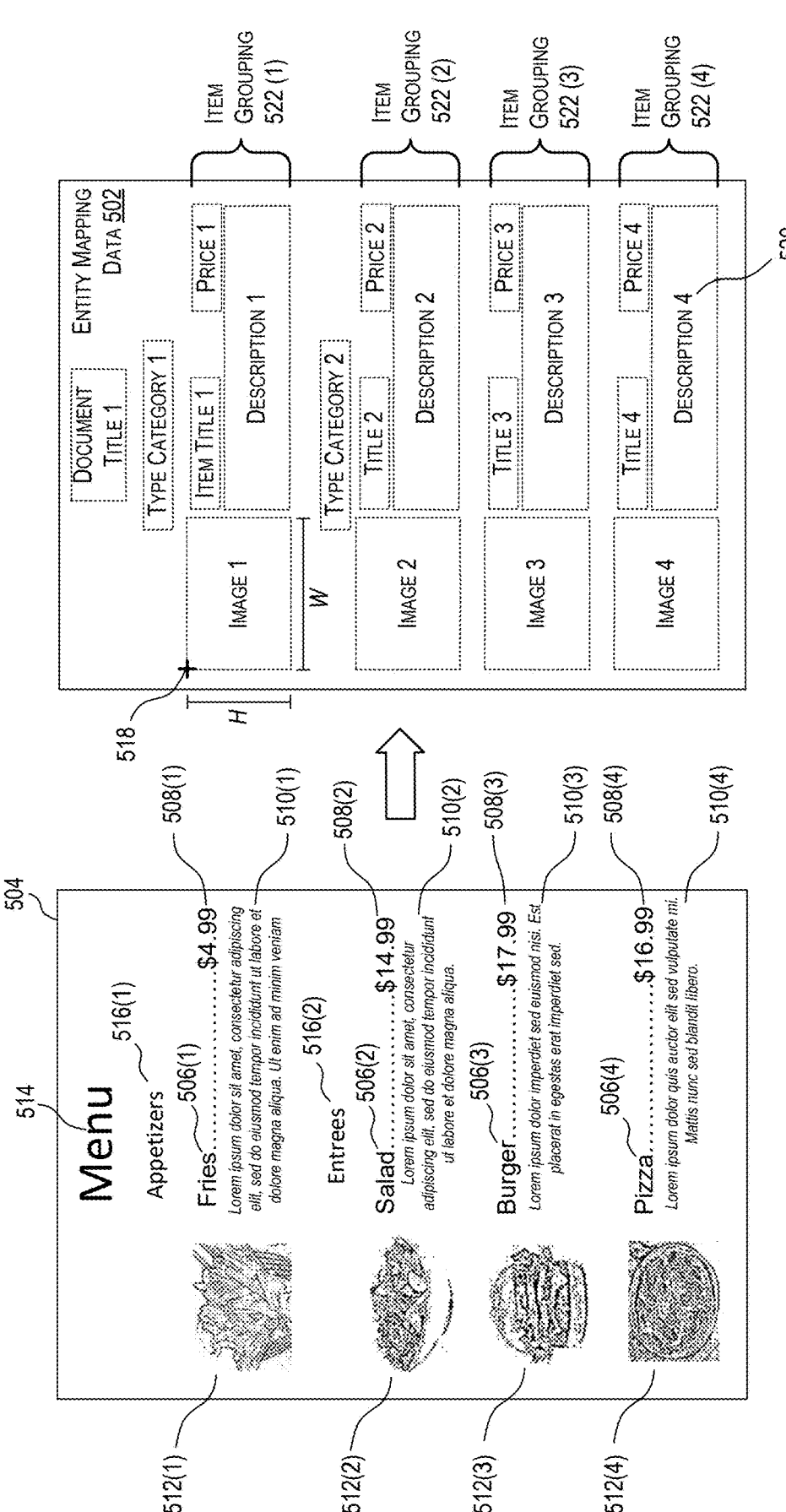
FIG. 5 is an example of techniques for generating entity mapping data 502 from an original document 504 according to an embodiment described herein.

FIG. 5 is an example of techniques for generating entity mapping data 502 from an original document 504 according to an embodiment described herein. As noted elsewhere, original document 504 may represent some document provided to a service provider. In some cases, the original document 504 may be an image (e.g., an image of a document), a PDF or other type of document, a website (e.g., as crawled by a webcrawler), or any other form of immutable information to be converted into a digital document.

For illustrative purposes, the original document 504 is presented as being structured as a food menu document in FIG. 5. However, it should be noted that the original document may be structured to include a number of other suitable document types/formats. As noted elsewhere, such a menu document may be provided as a PDF or other document type. Alternatively, such a menu document may be an image of a physical menu captured by a camera of a user device and provided to the service provider.

As depicted, an exemplary menu might include a number of different textual information to be preserved when converted into a digital document. For example, the menu may include a number of item titles 506 (1-4), a number of prices 508 (1-4), a number of item descriptions 510 (1-4), or any other suitable item-related textual information. Additionally, the menu may include a number of other data related to the listed items. For example, the menu may include a number of item images 512 (1-4) associated with the items. It should be noted that not all items listed on a menu may include every type of data included for the items. By way of example, some items in the list of items may not include an image 512. In some embodiments, an exemplary menu document may include a document title 514 and or an indication of one or more type categories 516 (1 and 2). In embodiments, each item grouping 522 may be associated with a type category 516 based on its relative position to that type category 516. For example, an item grouping 522 may be associated with the type category 516 that is above and closest to the item grouping 522.

As noted elsewhere, the information included within the original document original document 504 may be grouped into a number of different entities. Once a number of such entities have been identified, a bounding box 518 may be generated for each such entity. In embodiments, a bounding box may be associate with a set of coordinates within the original document that is assigned to a particular point of the bounding box 518 (e.g., top leftmost corner), a height H, and a width W. It should be noted that in cases in which bounding boxes for separate entities are found to overlap, the overlapping area may be assigned to the entity having its center closest to that overlapping area.

Once bounding boxes 518 have been generated for each of the entities identified within the original document, information associated with the respective entities may be used to generate entity labels to be assigned to each of those entities. It should be noted that similar entities may be assigned similar entity labels. As noted elsewhere, entity labels may be generated by providing features of the entities (e.g., text content, location, style, etc.) to a trained ML model (e.g., trained ML model 402 of FIG. 4).

Once entity labels have been assigned to each of the entities, those entities (referred to as object categories 520) may be assigned to an item grouping 522 (1-4). In embodiments, item groupings may be determined based on a pattern of recurring entities. For example, each item grouping may be configured to include at least one of each of a number of recurring entity types (as determined based on entity label). Each entity may be assigned to an item grouping based on a relative position of that entity to other entities in the respective item groupings. It should be noted that some entities (e.g., document title 514 and categories 516) may not be assigned to an item grouping. Once each entity has been assigned to an item grouping, those item groupings are used to populate item data that can be used to generate a digital version of the original document 504, as described in greater detail with respect to FIG. 6 below.

In some embodiments, template data may be generated to preserve a structure of the original document 504. For example, the locations of each of the bounding boxes 518 generated for the various entities identified within the original document may be maintained in the entity mapping data 502. Additionally, an indication of the features determined to be associated with those entities (e.g., font size, font style, font color, etc.) may also be maintained in template data. Furthermore, a mapping may be maintained between each of the bounding boxes 518 and a respective data field in item data. The template data may be used to generate a digital document by presenting data values in various data fields in locations associated with their respective bounding box and in the style that the original information was presented. Accordingly, visual information presented within a particular bounding box may be dynamically altered based on what is stored in item data for each of a number of items while maintaining the original position and style.

Figure 6:
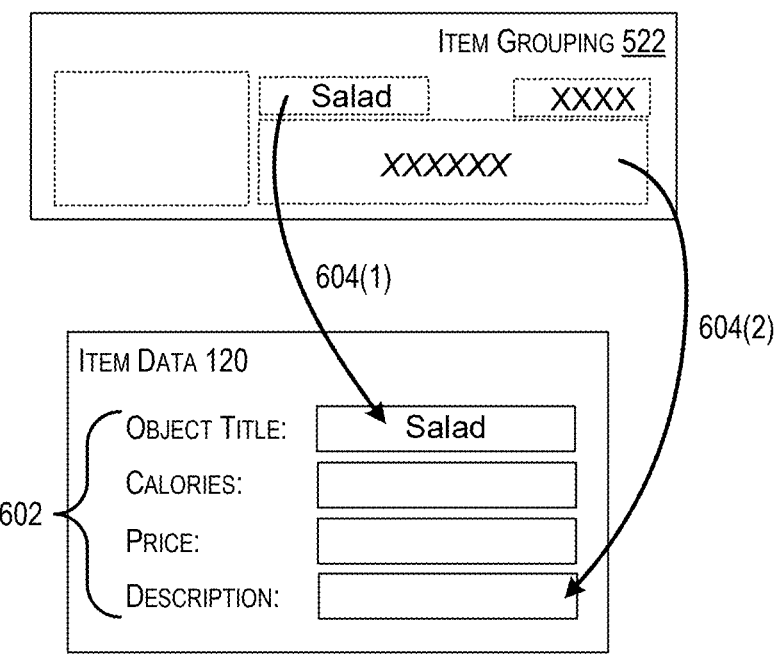
FIG. 6 is an example of techniques for populating data fields in item data with data values derived from corresponding entities according to an embodiment described herein.

FIG. 6 is an example of techniques for populating data fields in item data with data values derived from corresponding entities according to an embodiment described herein. As noted elsewhere, a number of item groupings 522 may be generated to each include a number of object categories (e.g., labeled entities) as identified within original document. Additionally, item data 120 may be maintained by a service provider to store information associated with various items.

In embodiments, each item grouping 522 may be associated with a particular item. The item may further be associated with a user (e.g., a merchant or other item provider) with which the original document is associated. In some cases, where the item data 120 does not already include an entry (e.g., a database entry) for an item associated with an item grouping 522, one may be generated automatically (e.g., by appending a new entry to a database table). Each item in the item data 120 may include a number of data fields 602. In some embodiments, individual data fields 602 may represent fields in a database table.

In embodiments, each object category associated with an item grouping 522 may be mapped to a corresponding data field in a database (or other suitable data store) in relation to the item associated with the respective item grouping. In some cases, this correlation may be based on a relationship between entity labels assigned to the object category and labels for individual data fields. Accordingly, one or more computer vision techniques (e.g., OCR) may be used to generate data values 604 (1 and 2) representative of the data included in each object category that are then populated into the corresponding data field.

It should be noted that once data fields 602 have been updated to include the data values generated from object categories within each item entity grouping, that item data may be used to generate a digital version of the original document. Particularly, the current data value stored in each data field may be used to populate visual information on a document at a location (and in a style) corresponding to the object category from which the data value for that data field was originally identified. Note that the information in the item data 120 may be updated, such that any new information would then be presented in the location and style of the original data value within the original document.

Figure 7:
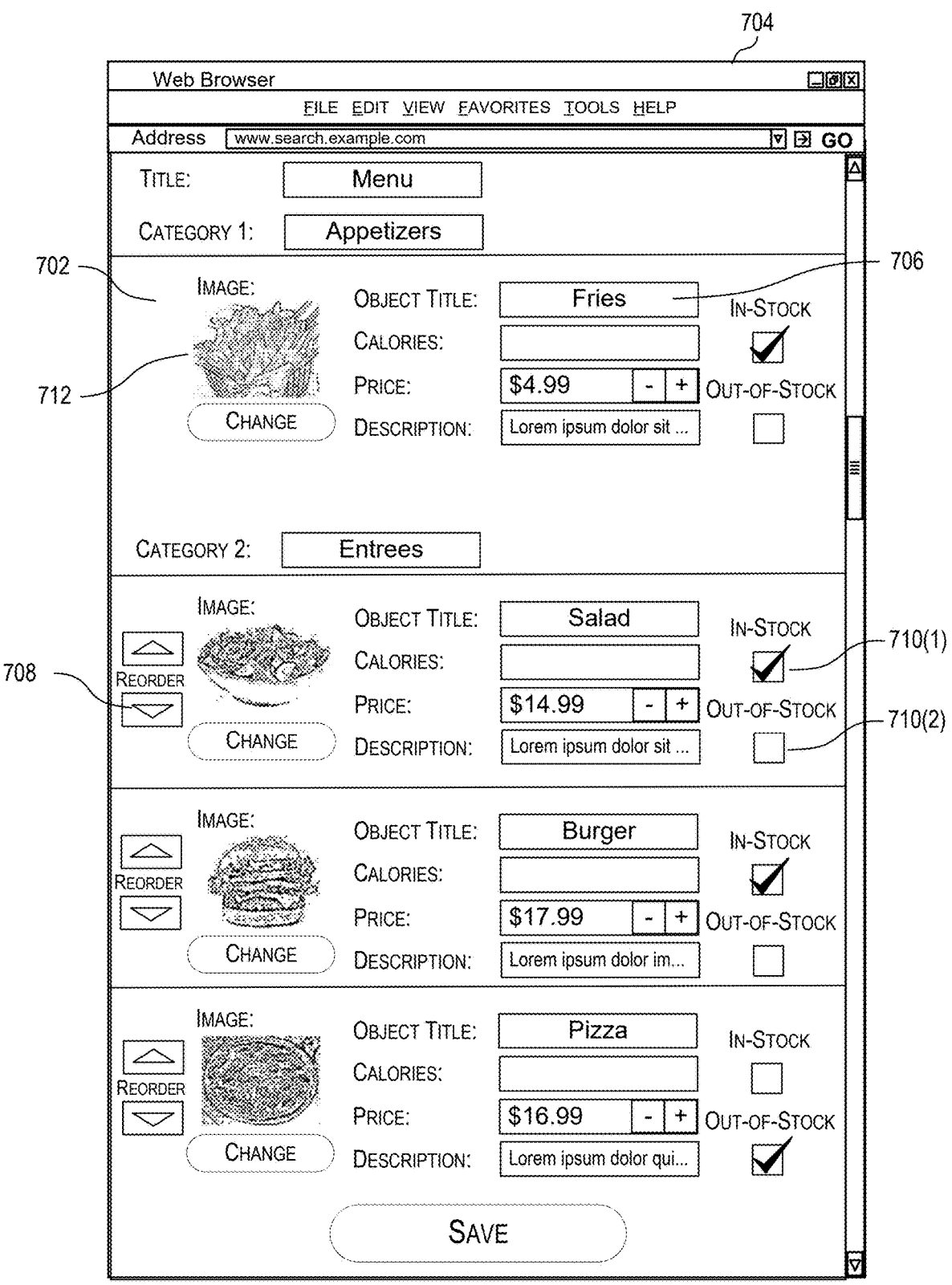
FIG. 7 is an example of a user interface that may be implemented to update data values associated with one or more items according to an embodiment described herein.

FIG. 7 is an example of a user interface that may be implemented to update data values associated with one or more items according to an embodiment described herein. As depicted, in some cases item information 702 to be used in generating a digital document may be presented via a user interface (UI) 704 associated with a web browser. In other cases, the item information may be presented via a user interface (UI) associated with a software application, such as a software application executed on a user device. In some cases, the item information 702 and/or functionality described in relation to FIG. 7 may be provided to a user (e.g., a merchant) from which the original document was received and for whom a digital document is to be generated. Information provided via input to the UI 704 may be saved to the item data 120.

In embodiments, a user interface may include one or more text input fields 706 that each correspond to data values stored in relation to corresponding data fields within the item data 120. Using the text input fields 706, a user may be provided with the ability to alter or otherwise update those data values. Such changes may be reflected in any digital document that is generated based on those data values, in that the presented information may be altered while maintaining the same position within the document and style.

Additionally, in some embodiments, the user interface may include one or more interactive elements 708 that may be used to alter a position, look, or style of the information included in a generated digital document. For example, interactive elements 708 may be provided that allow a user to alter a position of one or more item groupings within a template such that the item information is rearranged in the resulting digital document.

Additionally, in some embodiments, the user interface may include one or more interactive elements 710 (1 and 2) that may be used to change one or more functionality associated with the generated digital document. For example, a user may provide input that one or more items is not currently available, preventing a transaction from being completed with respect to that item via the generated digital document.

In some embodiments, an image 712 may be associated with an item to be included in a digital document. In some embodiments, such an image may be obtained from an object category corresponding to an image associated with the item in the original document. In some embodiments, one or more data values/content derived from object categories associated with an item may be used to generate such an image. For example, the one or more data values/content may be provided to a machine learning model trained to generate images from textual information. In some implementations, the image may be obtained from the original document. For example, the original document may show a menu that includes one or more images that correspond to the respective one or more items. In some implementations, the original document may represent a website that includes embedded images and where values of attributes are additionally used by an entity linking module 114 to determine whether an image corresponds to (e.g., should be linked to) an item grouping associated with an item. For example, the entity linking module 114 may determine that an image of a hamburger on a webpage corresponds to an item extracted from the webpage with a title of hamburger based on a data value of "Hamburger" being associated with the image (e.g., within metadata attached to the image).

Figure 8:
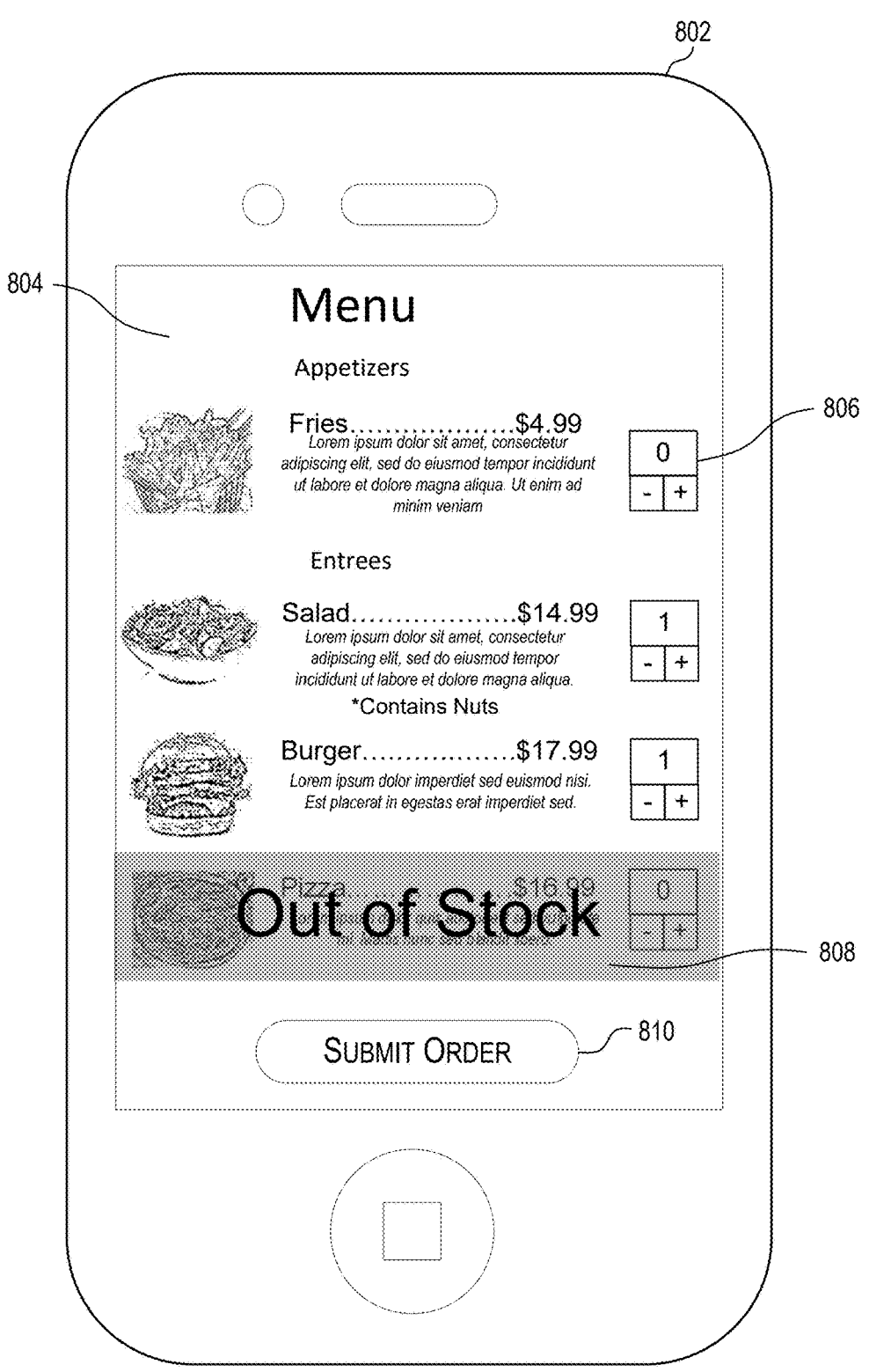
FIG. 8 is an example of a digital version of a document presented via a user interface on a user device according to an embodiment described herein.

FIG. 8 is an example of a digital version of an original document presented via a user interface on a user device according to an embodiment described herein. As noted elsewhere, the service provider may generate a digital version of an original document provided to it. That digital version of the original document may be presented to a user of a user device 802 via an instantiated UI 804. In some embodiments, the UI 804 may be instantiated upon execution of a software application (e.g., a web browser) installed upon the user device 802.

As depicted, the digital version of the original document, as presented in the UI 804, may include a number of interactive elements that enable a user of the user device 802 to interact with the items depicted in the digital document. For example, the UI may include an interactive element 806 that enables a user to select a quantity of the item to be purchased.

In some embodiments, the UI may include elements that are supplemental to the digital version of the original document. Such elements may or may not affect the functionality associated with the underlying digital version of the original document. For example, if a determination is made that an item is out of stock or otherwise unavailable, then an element 808 may be presented (e.g., overlaying the representation of the respective item) indicating the unavailability of the item.

In embodiments, the digital document may further include at least one interactive element 810 capable of enabling a user of the user device 802 to complete a transaction in relation to one or more items associated with the digital document. Upon selection of the interactive element 810, an account associated with a user of the user device 802 is caused to be charged for an amount determined based on the selected items. Additionally, a notification is provided to a user associated with the digital document (e.g., a merchant) indicating the items associated with the transaction.

FIG. 9 is a flow chart the illustrates a process for generating a digital document by identifying supplemental data for the item according to an embodiment described herein. The process 900 may be performed by a service provider, such as the service provider 104 as described in relation to FIG. 1 above. In embodiments, the process 900 may be used to convert or otherwise transition an electronic catalog of items from a first ecommerce platform to a second ecommerce platform.

At 902, the process 900 involves receiving raw data associated with an original document to be converted into a digital (e.g., interactive) document. In some embodiments, the raw data may include an image captured of the original document, such as a menu or catalog page. In some embodiments, the raw data may include some form of document, such as a PDF. In at least some of these embodiments, a provided document may be an immutable document that is unable to be updated. In some embodiments, the raw data may be a website, such as an electronic store maintained by a merchant or other suitable user. Such website data may be received from a web crawler or other automated document scraper.

At 904, the process 900 involves receiving a request from a user to generate a digital document to be associated with that user. In some cases, the user may request a digital document that provides ecommerce functionality by facilitating sales of one or more items offered by the user. In some cases, the user may provide the raw data along with the request. For example, the user may submit an image of a document to be converted into a digital document. In other cases, the system may, upon receiving the request from the user, retrieve the raw data associated with that user (e.g., scrape a website associated with the user, etc.) in order to complete the request.

At 906, the process 900 involves identifying a number of items depicted within the raw data as well as a groupings of object categories to be associated with those items. As described elsewhere, raw data is processed to identify a number of entities (e.g., characters, symbols, images, etc.). The identified entities may be grouped based on similarities between those entities and bounding boxes may be generated for the grouped entities. Information about the identified entities and bounding boxes can be used to generate entity labels to be associated with respective grouped entities, creating object categories. Object categories may then be assigned to the identified items as described elsewhere.

At 908, the process 900, a determination may be made as to whether the identified item is already included in a catalog of items. In some embodiments, an item catalog may be maintained by the service provider on behalf of one or more users (e.g., merchants). For example, a number of different merchants that use a platform operated by the service provider may already offer the same (or similar) items for sale as are identified within the raw data. Accordingly, information about that item, or at least a similar item, may already be included within the item catalog. In some embodiments, an item record in the item catalog may be identified based on matching a title or other identifier for the item.

Upon determining that the item is not in the item catalog (e.g., "No" from decision block 908), the process 900 may involve adding information about the item to that catalog at 910. In embodiments, this may involve generating an item record to be appended to the item catalog and appending that record to the databased table representing the item catalog.

Upon determining that the item is already in the item catalog (e.g., "Yes" from decision block 908), the process 900 may involve identifying supplemental information about the item to be added to the item information at 912. In some embodiments, information about the item stored in the item record within the item catalog may be retrieved and compared to the information about the item derived from the object categories of the raw data. In these embodiments, supplemental item information may be identified as information about the item that was derived from the object categories but is not currently included in the item record. In these embodiments, one or more data fields of the item record associated with that data may be populated with the supplemental information. In some embodiments, inconsistent information between what was retrieved and what was generated may cause a notification to be provided to a user for the user to confirm whether to replace the retrieved information with the generated information.

At 914, the process 900 involves generating a digital document to include item data retrieved from the item catalog. In embodiments, the data values included in each of the data fields of each item record associated with an item identified within the raw data may be retrieved and populated into a position (and in a style) of the corresponding object categories within the raw data. Additionally, one or more interactive elements may be added to the digital document to enable a user to perform an action in relation to one or more items depicted within the digital document. In some embodiments, such an action might be to place an order for, or conduct a transaction related to, the one or more items.

At 916, the process 900 involves associating the digital document with a payment processing network. In embodiments, the digital document is linked to an account associated with the user from which the request for the digital document originated. In some cases, once the digital document is provided to an ecommerce platform to be distributed to one or more user devices, any transactions initiated via the digital document may automatically be conducted in relation to the linked account.

At 918, the process 900 involves causing the digital document to be displayed on a user device. Upon being provided to a user device, the digital document can be presented to a user of that user device via a user interface instantiated on the user device. In some embodiments, the user interface may be instantiated in association with a software application, such as a web browser or other suitable application. Upon its presentation via the user interface of the user device, a user may be provided with the ability to select one or more items in order to initiate a transaction. Upon initiating such a transaction, information (e.g., payment information) may be provided by the user device to the payment processing network associated with the digital document in order to complete the transaction.

Figure 10:
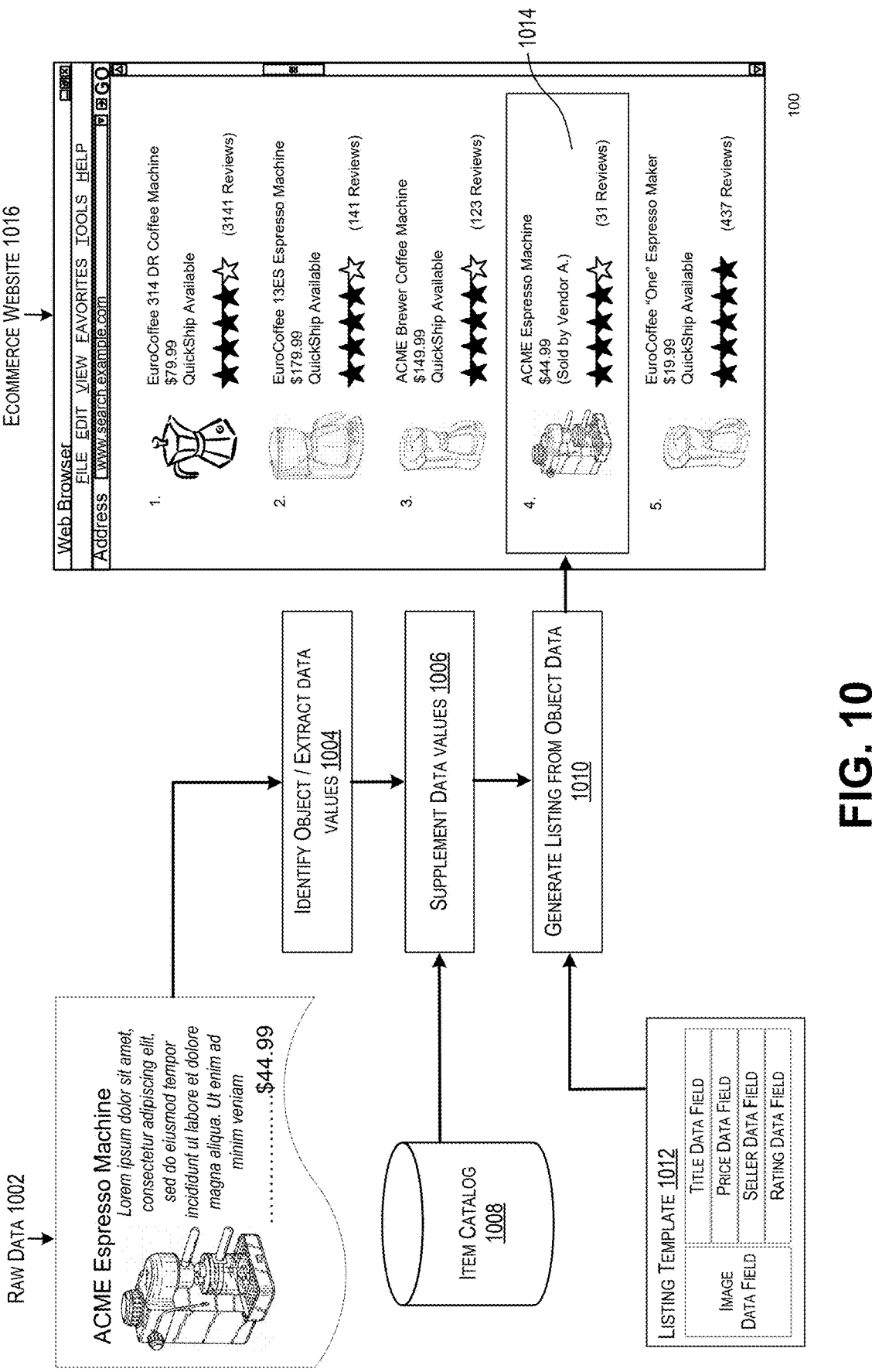
FIG. 10 is an example of a process for receiving an original document and generating a digital document in the form of a product listing according to an embodiment described herein.

FIG. 10 is an example of a process for receiving raw data and generating a digital document in the form of a product listing according to an embodiment described herein. In embodiments, the raw data 1002 may be a document that includes information about a product to be offered for sale by a merchant or other vendor. For example, the raw data 1002 may be a product listing on a catalog (e.g., either a physical catalog or an electronic catalog). In this example, the product listing may include a number of details about the item (i.e., product).

Upon receiving the raw data 1002, one or more computer vision techniques may be performed on the raw data at 1004 to identify the item depicted in the product listing as well as one or more data values associated with the item. In some cases, this may involve the use of object recognition techniques to identify the object in the listing based on an image included in the listing. In some cases, this may involve the use of OCR techniques to determine textual information included in the product listing.

In embodiments in which the raw data 1002 is a website, one or more data values may be extracted by parsing hypertext markup language (html) used to generate that website. For example, upon identifying a portion of the website to be attributed to a particular data field, a data value for that data field may be extracted from the html used to generate the portion of the website.

In some embodiments, at 1006 the data values detected for the item in the product listing may be supplemented based on information included in an item catalog 1008. An item catalog may include information about a number of different items offered for sale by a number of different merchants. The item information may be stored in a number of data records, each of which is associated with an item offered for sale. In embodiments, upon identifying the item in the product listing, a data record associated with that item may be retrieved from the item catalog. One or more data values not included in the product listing, but stored in that data record, may be retrieved and associated with the identified item. For example, a user rating for an item may be retrieved that represents an aggregated rating value based on user reviews about the item provided by a number of different customers who purchased the item from a number of different merchants.

In embodiments, a digital (e.g., electronic) version of the product listing 1014 may be generated to be offered for sale on an ecommerce website at 1010. In some embodiments, a listing template 1012 may be identified in relation to a particular ecommerce website on which the item is to be offered for sale, in that the listing template 1012 may be structured in a manner that is used by the particular ecommerce website. In some embodiments, a listing template 1012 may be identified in relation to a particular user of the ecommerce platform (e.g., a merchant). Data fields of the listing template may be populated with one or more of the data values identified/retrieved in relation to the item. Once the product listing 1014 has been generated by populating the listing template 1012 with the item information, that listing can be provided to the ecommerce platform to be included in a product catalog.

In some embodiments, the product listing 1014 may be presented along with other product listings for the same merchant, which may be generated from the same raw data 1002 or different raw data associated with the same merchant. In other words, the process described in FIG. 10 may be used to quickly, and with minimal effort on behalf of a merchant, convert an electronic storefront on a first ecommerce platform to a second electronic storefront on a second ecommerce platform.

In some embodiments, the product listing 1014 may be presented on an ecommerce website unaffiliated with the merchant along with a list of product listings for similar products sold by other merchants when a search is conducted for the item associated with the product listing 1014. It should be noted that the product listing 1014 may be provided on behalf of the user offering the item for sale, such that the completing of the sale will result in funds being transferred to an account associated with that user.

Figure 11:
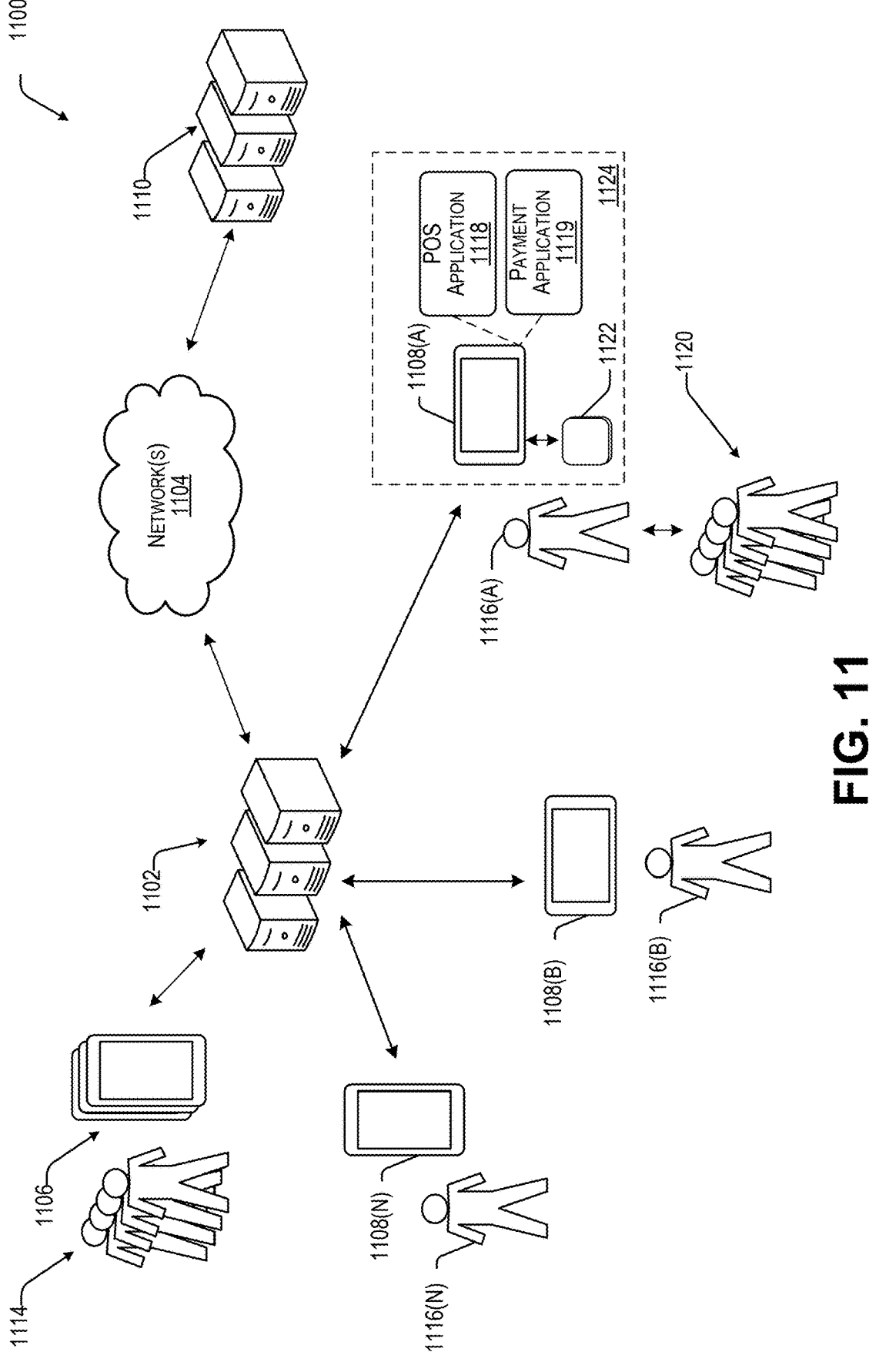
FIG. 11 is an example environment with user devices, merchant devices, a payment service, and/or other systems that may be involved in a transaction, such as by utilizing the payment application as configured herein, according to an embodiment described herein.

FIG. 11 is an example environment with user devices, merchant devices, a payment service, and/or other systems that may be involved in a transaction, such as by utilizing the payment application as configured herein, according to an embodiment described herein. The environment 1100 includes server(s) 1102 that can communicate over a network 1104 with user devices 1106 (which, in some examples can be merchant devices 1108 (individually, 1108(A)-1108(N))) and/or server(s) 1110 associated with third-party service provider(s). The server(s) 1102 can be associated with a service provider that can provide one or more services for the benefit of users 1114, as described below. Actions attributed to the service provider can be performed by the server(s) 1102.

The environment 1100 can include a plurality of user devices 1106, as described above. Each one of the plurality of user devices 1106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1114. The users 1114 can be referred to as customers, buyers, merchants, sellers, borrowers, employees, employers, payors, payees, couriers and so on. The users 1114 can interact with the user devices 1106 via user interfaces presented via the user devices 1106. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1106 can have an instance or versioned instance of an application, which can be downloaded from an application store, for example, which can present the user interface(s) described herein. In at least one example, a user 1114 can interact with the user interface via touch input, spoken input, or any other type of input.

As described above, in at least one example, the users 1114 can include merchants 1116 (individually, 1116(A)-1116(N)). In an example, the merchants 1116 can operate respective merchant devices 1108, which can be user devices 1106 configured for use by merchants 1116. For the purpose of this discussion, a "merchant" can be any entity that offers items (e.g., goods or services) for purchase or other means of acquisition (e.g., rent, borrow, barter, etc.). The merchants 1116 can offer items for purchase or other means of acquisition via brick-and-mortar stores, mobile stores (e.g., pop-up shops, food trucks, etc.), online stores, combinations of the foregoing, and so forth. In some examples, at least some of the merchants 1116 can be associated with a same entity but can have different merchant locations and/or can have franchise/franchisee relationships. In additional or alternative examples, the merchants 1116 can be different merchants. That is, in at least one example, the merchant 1116(A) is a different merchant than the merchant 1116(B) and/or the merchant 1116(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1108 can have an instance of a POS application 1118 stored thereon. The POS application 1118 can configure the merchant device 1108 as a POS terminal, which enables the merchant 1116(A) to interact with one or more customers 1120. As described above, the users 1114 can include customers, such as the customers 1120 shown as interacting with the merchant 1116(A). For the purpose of this discussion, a "customer" can be any entity that acquires items from merchants. While only two customers 1120 are illustrated in FIG. 11, any number of customers 1120 can interact with the merchants 1116. Further, while FIG. 11 illustrates the customers 1120 interacting with the merchant 1116(A), the customers 1120 can interact with any of the merchants 1116.

In at least one example, interactions between the customers 1120 and the merchants 1116 that involve the exchange of funds (from the customers 1120) for items (from the merchants 1116) can be referred to as "transactions." In at least one example, the POS application 1118 can determine transaction data associated with the POS transactions. Transaction data can include payment information, which can be obtained from a reader device 1122 associated with the merchant device 1108(A), user authentication data, purchase amount information, point-of-purchase information (e.g., item(s) purchased, date of purchase, time of purchase, etc.), etc. The POS application 1118 can send transaction data to the server(s) 1102 such that the server(s) 1102 can track transactions of the customers 1120, merchants 1116, and/or any of the users 1114 over time. Furthermore, the POS application 1118 can present a UI to enable the merchant 1116(A) to interact with the POS application 1118 and/or the service provider via the POS application 1118.

In at least one example, the merchant device 1108(A) can be a special-purpose computing device configured as a POS terminal (via the execution of the POS application 1118). In at least one example, the POS terminal may be connected to a reader device 1122, which is capable of accepting a variety of payment instruments, such as credit cards, debit cards, gift cards, short-range communication-based payment instruments, and the like, as described below. In at least one example, the reader device 1122 can plug in to a port in the merchant device 1108(A), such as a microphone port, a headphone port, an audio-jack, a data port, or other suitable port. In additional or alternative examples, the reader device 1122 can be coupled to the merchant device 1108(A) via another wired or wireless connection, such as via a Bluetooth®, BLE, and so on. In some examples, the reader device 1122 can read information from alternative payment instruments including, but not limited to, wristbands and the like.

In some examples, the reader device 1122 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1122, and communicate with the server(s) 1102, which can provide, among other services, a payment processing service. The server(s) 1102 associated with the service provider can communicate with server(s) 1110, as described below. In this manner, the POS terminal and reader device 1122 may collectively process transaction(s) between the merchants 1116 and customers 1120. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1122 of the POS system 1124 are shown as separate devices, in additional or alternative examples, the POS terminal and the reader device 1122 can be part of a single device. In some examples, the reader device 1122 can have a display integrated therein for presenting information to the customers 1120. In additional or alternative examples, the POS terminal can have a display integrated therein for presenting information to the customers 1120. POS systems, such as the POS system 1124, may be mobile, such that POS terminals and reader devices may process transactions in disparate locations across the world. POS systems can be used for processing card-present transactions and card-not-present (CNP) transactions, as described below.

A card-present transaction is a transaction where both a customer 1120 and his or her payment instrument are physically present at the time of the transaction. Card-present transactions may be processed by swipes, dips, taps, or any other interaction between a physical payment instrument (e.g., a card), or otherwise present payment instrument, and a reader device 1122 whereby the reader device 1122 is able to obtain payment data from the payment instrument. A swipe is a card-present transaction where a customer 1120 slides a card, or other payment instrument, having a magnetic strip through a reader device 1122 that captures payment data contained in the magnetic strip. A dip is a card-present transaction where a customer 1120 inserts a payment instrument having an embedded microchip (i.e., chip) into a reader device 1122 first. The dipped payment instrument remains in the payment reader until the reader device 1122 prompts the customer 1120 to remove the card, or other payment instrument. While the payment instrument is in the reader device 1122, the microchip can create a one-time code which is sent from the POS system 1124 to the server(s) 1110 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1120 may tap or hover his or her payment instrument (e.g., card, electronic device such as a smart phone running a payment application, etc.) over a reader device 1122 to complete a transaction via short-range communication (e.g., NFC, RFID, Bluetooth®, BLE, etc.). Short-range communication enables the payment instrument to exchange information with the reader device 1122. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1124, the server(s) 1102, and/or the server(s) 1110 may exchange payment information and transaction data to determine whether transactions are authorized. For example, the POS system 1124 may provide encrypted payment data, user authentication data, purchase amount information, point-of-purchase information, etc. (collectively, transaction data) to server(s) 1102 over the network(s) 1104. The server(s) 1102 may send the transaction data to the server(s) 1110. As described above, in at least one example, the server(s) 1110 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1110 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1110 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1110 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1110 associated therewith), and a payment authorization message is communicated from the issuer to the POS device via a path opposite of that described above, or via an alternate path.

As described above, the server(s) 1110, which can be associated with payment service provider(s), may determine whether the transaction is authorized based on the transaction data, as well as information relating to parties to the transaction (e.g., the customer 1120 and/or the merchant 1116(A)). The server(s) 1110 may send an authorization notification over the network(s) 1104 to the server(s) 1102, which may send the authorization notification to the POS system 1124 over the network(s) 1104 to indicate whether the transaction is authorized. The server(s) 1102 may also transmit additional information such as transaction identifiers to the POS system 1124. In one example, the server(s) 1102 may include a merchant application and/or other functional components for communicating with the POS system 1124 and/or the server(s) 1110 to authorize or decline transactions.

Based on the authentication notification that is received by the POS system 1124 from server(s) 1102, the merchant 1116(A) may indicate to the customer 1120 whether the transaction has been approved. In some examples, approval may be indicated at the POS system 1124, for example, at a display of the POS system 1124. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1114 can access all of the services of the service provider. In other examples, the users 1114 can have gradated access to the services, which can be based on risk tolerance, IDV outputs, subscriptions, and so on. In at least one example, access to such services can be availed to the merchants 1116 via the POS application 1118. In additional or alternative examples, each service can be associated with its own access point (e.g., application, web browser, etc.).

The service provider can offer payment processing services for processing payments on behalf of the merchants 1116, as described above. For example, the service provider can provision payment processing software, payment processing hardware and/or payment processing services to merchants 1116, as described above, to enable the merchants 1116 to receive payments from the customers 1120 when conducting POS transactions with the customers 1120. For instance, the service provider can enable the merchants 1116 to receive cash payments, payment card payments, and/or electronic payments from customers 1120 for POS transactions and the service provider can process transactions on behalf of the merchants 1116.

As the service provider processes transactions on behalf of the merchants 1116, the service provider can maintain accounts or balances for the merchants 1116 in one or more ledgers. For example, the service provider can analyze transaction data received for a transaction to determine an amount of funds owed to a merchant 1116(A) for the transaction. In at least one example, such an amount can be a total purchase price less fees charged by the service provider for providing the payment processing services. Based on determining the amount of funds owed to the merchant 1116(A), the service provider can deposit funds into an account of the merchant 1116(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1116(A) to a bank account of the merchant 1116(A) that is held at a bank or other financial institution (e.g., associated with the server(s) 1110). Scheduled deposits can occur at a prearranged time after a POS transaction is funded, which can be a business day after the POS transaction occurred, or sooner or later. In some examples, the merchant 1116(A) can access funds prior to a scheduled deposit. For instance, the merchant 1116(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1116(A) can have a payment instrument that is linked to the stored balance that enables the merchant to access the funds without first transferring the funds from the account managed by the service provider to the bank account of the merchant 1116(A).

In at least one example, the service provider may provide inventory management services. That is, the service provider may provide inventory tracking and reporting. Inventory management services may enable the merchant 1116(A) to access and manage a database storing data associated with a quantity of each item that the merchant 1116(A) has available (i.e., an inventory). Furthermore, in at least one example, the service provider can provide catalog management services to enable the merchant 1116(A) to maintain a catalog, which can be a database storing data associated with items that the merchant 1116(A) has available for acquisition (i.e., catalog management services). In at least one example, the catalog may include a plurality of data items and a data item of the plurality of data items may represent an item that the merchant 1116(A) has available for acquisition. The service provider can offer recommendations related to pricing of the items, placement of items on the catalog, and multi-party fulfilment of the inventory.

In at least one example, the service provider can provide business banking services, which allow the merchant 1116(A) to track deposits (from payment processing and/or other sources of funds) into an account of the merchant 1116(A), payroll payments from the account (e.g., payments to employees of the merchant 1116(A)), payments to other merchants (e.g., business-to-business) directly from the account or from a linked debit card, withdrawals made via scheduled deposit and/or instant deposit, etc. Furthermore, the business banking services can enable the merchant 1116(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1116 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally, and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally, or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1116. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 1112 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1114 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1116. In at least one example, the service provider can recommend and/or generate content items to supplement omni-channel presences of the merchants 1116. That is, if a merchant of the merchants 1116 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1114 to set schedules for scheduling appointments and/or users 1114 to schedule appointments.

In some examples, the service provider can provide restaurant management services to enable users 1114 to make and/or manage reservations, to monitor front-of-house and/or back-of-house operations, and so on. In such examples, the merchant device(s) 1108 and/or server(s) 1102 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1114 who can travel between locations to perform services for a requesting user 1114 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1106.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1114, voice inputs into a virtual assistant or the like, to determine intents of user(s) 1114. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1114 may be new to the service provider such that the user 1114 that has not registered (e.g., subscribed to receive access to one or more services offered by the service provider) with the service provider. The service provider can offer onboarding services for registering a potential user 1114 with the service provider. In some examples, onboarding can involve presenting various questions, prompts, and the like to a potential user 1114 to obtain information that can be used to generate a profile for the potential user 1114. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1114 providing all necessary information, the potential user 1114 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1110). That is, the service provider can offer IDV services to verify the identity of users 1114 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1114 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1110 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1102) and/or the server(s) 1110 via the network(s) 1104. In some examples, the merchant device(s) 1108 are not capable of connecting with the service provider (e.g., the server(s) 1102) and/or the server(s) 1110, due to a network connectivity issue, for example. In additional or alternative examples, the server(s) 1102 are not capable of communicating with the server(s) 1110 due to network connectivity issue, for example. In such examples, devices may operate in "offline" mode where at least some payment data is stored (e.g., on the merchant device(s) 1108) and/or the server(s) 1102 until connectivity is restored and the payment data can be transmitted to the server(s) 1102 and/or the server(s) 1110 for processing.

In at least one example, the service provider can be associated with a hub, such as an order hub, an inventory hub, a fulfillment hub and so on, which can enable integration with one or more additional service providers (e.g., associated with the additional server(s) 1110). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1106 that are in communication with one or more server computing devices 1102 of the service provider. That is, techniques described herein are directed to a specific implementation—or a practical application—of utilizing a distributed system of user devices 1106 that are in communication with one or more server computing devices 1102 of the service provider to perform a variety of services, as described above. The unconventional configuration of the distributed system described herein enables the server(s) 1102 that are remotely located from end-users (e.g., users 1114) to intelligently offer services based on aggregated data associated with the end-users, such as the users 1114 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1114 and user devices 1106. Furthermore, such features are changed dynamically based on the profiles of the users involved interacting with the GUIs. As such, techniques described herein are directed to improvements to computing systems.

Figure 12:
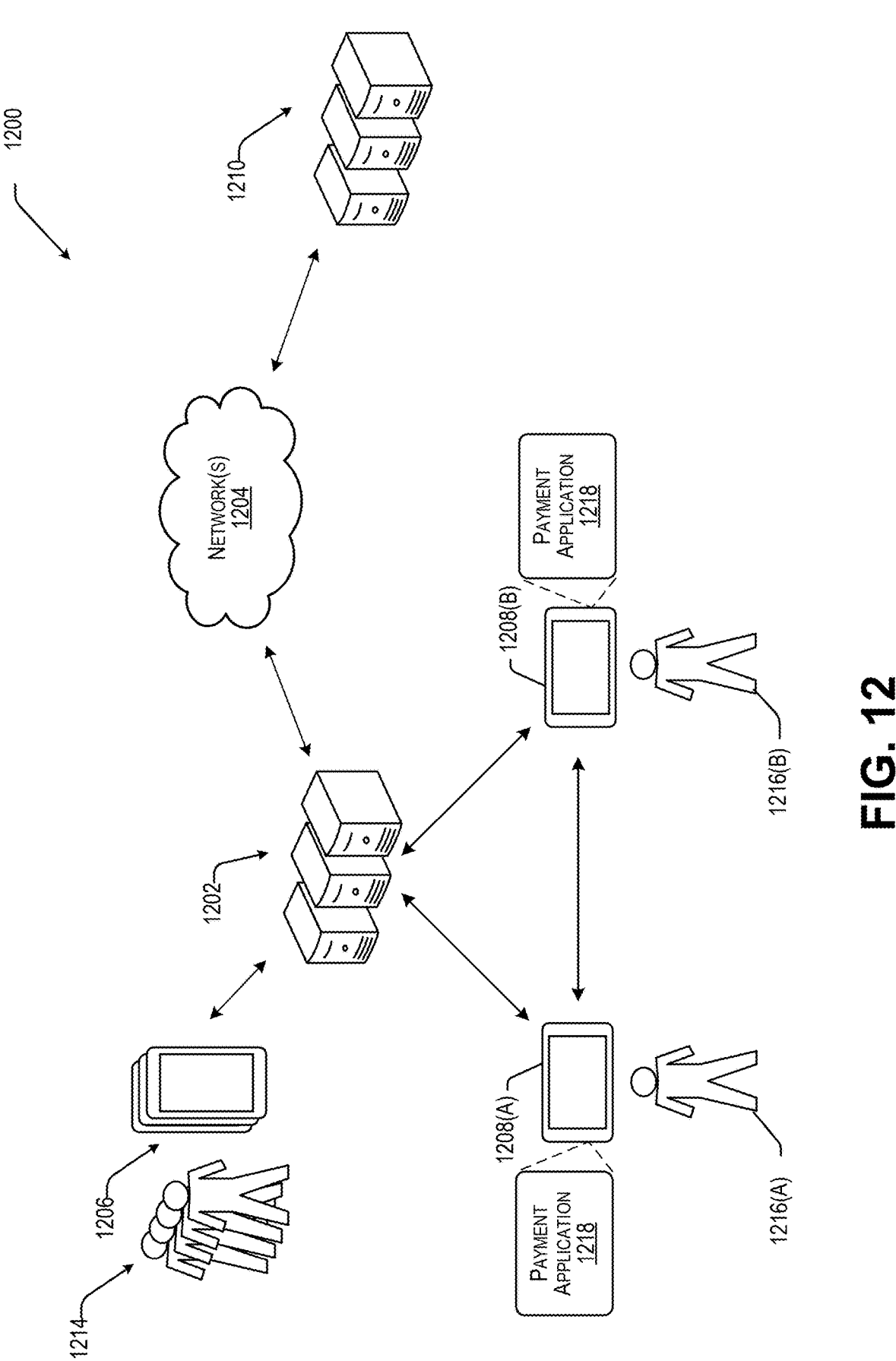
FIG. 12 is an example environment illustrating usage of the payment application, according to an embodiment described herein.

FIG. 12 is an example environment illustrating usage of the payment application, according to an embodiment described herein. The environment 1200 includes server(s) 1202 that can communicate over a network 1204 with user devices 1206 (which, in some examples can be user devices 1208 (individually, 1208(A), 1208(B)) and/or server(s) 1210 associated with third-party service provider(s). The server(s) 1202 can be associated with a service provider that can provide one or more services for the benefit of users 1214, as described below. Actions attributed to the service provider can be performed by the server(s) 1202. In some examples, the service provider referenced in FIG. 11 can be the same or different than the service provider referenced in FIG. 12.

The environment 1200 can include a plurality of user devices 1206, as described above. Each one of the plurality of user devices 1206 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1214. The users 1214 can be referred to as customers, buyers, merchants, sellers, borrowers, employees, employers, payors, payees, couriers and so on. The users 1214 can interact with the user devices 1206 via user interfaces presented via the user devices 1206. In at least one example, a user interface can be presented via a web browser, or the like. In other examples, a user interface can be presented via an application, such as a mobile application or desktop application, which can be provided by the service provider, or which can be an otherwise dedicated application. In some examples, individual of the user devices 1206 can have an instance or versioned instance of an application, which can be downloaded from an application store, for example, which can present the user interface(s) described herein. In at least one example, a user 1214 can interact with the user interface via touch input, spoken input, or any other type of input.

In at least one example, the service provider can provide a peer-to-peer payment service that enables peer-to-peer payments between two or more users 1214. Two users, user 1216(A) and user 1216(B) are illustrated in FIG. 12 as "peers" in a peer-to-peer payment. In at least one example, the service provider can communicate with instances of a payment application 1218 (or other access point) installed on devices 1206 configured for operation by users 1214. In an example, an instance of the payment application 618 executing on a first device 1208(A) operated by a payor (e.g., user 1216(A)) can send a request to the service provider to transfer an asset (e.g., fiat currency, non-fiat currency, cryptocurrency, securities, gift cards, and/or related assets) from the payor to a payee (e.g., user 1216(B)) via a peer-to-peer payment. In some examples, assets associated with an account of the payor are transferred to an account of the payee. In some examples, assets can be held at least temporarily in an account of the service provider prior to transferring the assets to the account of the payee.

In some examples, the service provider can utilize a ledger system to track transfers of assets between users 1206. FIG. 13, below, provides additional details associated with such a ledger system. The ledger system can enable users 1206 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1218 executing on user device(s) of payee(s). As an example, the service provider can transfer assets from an account of user 1216(A) to an account of the user 1216(B) and can send a notification to the user device 1208(B) of the user 1216(B) for presentation via a user interface. The notification can indicate that a transfer is in process, a transfer is complete, or the like. In some examples, the service provider can send additional or alternative information to the instances of the payment application 1218 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 602 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1218 executing on the user devices 1206. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a URL that incorporates the payment proxy. In such examples, the landing page can be a web page, e.g., www.cash.me/$Cash.

In some examples, the peer-to-peer payment process can be implemented within a forum. The term "forum," as used here, refers to a given platform (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 12. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1206 (e.g., mobile device or conventional personal computer (PC)) based on instructions transmitted to and from the server(s) 1202 (which, in such an example can be called a "messaging server"). In some instances, the messaging application can include a payment application with messaging capability that enables users of the payment application to communicate with one another. In such instances, the payment application can be executed on a user device 1206 based on instructions transmitted to and from the server(s) 1202 (e.g., the payment service discussed in this description or another payment service that supports payment transactions). In some examples, the messaging application can be provided by a third-party service provider associated with the server(s) 1210. In examples where the messaging application is a third-party service provider, the server(s) 1210 can be accessible via one or more APIs or other integrations.

As described above, the service provider can facilitate peer-to-peer transactions, which can enable users 1206 to transfer fiat currency, non-fiat currency, cryptocurrency, securities, or other assets, or portions thereof, to other users 1206. In at least one example, individual users can be associated with user accounts. Additional details associated with user accounts and the transfer of assets between users 1206 are described below with reference to FIG. 13.

Furthermore, the service provider of FIG. 12 can enable users 1206 to perform banking transactions via instances of the payment application 1218. For example, users can configure direct deposits or other deposits for adding assets to their various ledgers/balances. Further, users 1206 can configure bill pay, recurring payments, and/or the like using assets associated with their accounts. In addition to sending and/or receiving assets via peer-to-peer transactions, users 1206 buy and/or sell assets via asset networks such as cryptocurrency networks, securities networks, and/or the like.

FIG. 13 is an example of data store(s) that can be associated with servers of the payment service, according to an embodiment described herein. In at least one example, the data store(s) 1300 can store assets in an asset storage 1302, as well as data in user account(s) 1304, merchant account(s) 1306, and/or customer account(s) 1308. In at least one example, the asset storage 1302 can be used to store assets managed by the service provider of FIG. 12. In at least one example, the asset storage 1302 can be used to record whether individual of the assets are registered to users. For example, the asset storage 1302 can include an asset wallet 1310 for storing records of assets owned by the service provider of FIG. 12, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1210 can be associated therewith. In some examples, the asset wallet 1310 can communication with the asset network via one or more components associated with the server(s) 1202.

The asset wallet 1310 can be associated with one or more addresses and can vary addresses used to acquire assets (e.g., from the asset network(s)) so that its holdings are represented under a variety of addresses on the asset network. In examples where the service provider of FIG. 12 has its own holdings of cryptocurrency (e.g., in the asset wallet 1310), a user can acquire cryptocurrency directly from the service provider of FIG. 12. In some examples, the service provider of FIG. 12 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1302 may contain ledgers that store records of assignments of assets to users 1206. Specifically, the asset storage 1302 may include asset ledger 1310, fiat currency ledger 1314, and other ledger(s) 1316, which can be used to record transfers of assets between users 1206 of the service provider and/or one or more third parties (e.g., merchant network(s), payment card network(s), ACH network(s), equities network(s), the asset network, securities networks, etc.). In doing so, the asset storage 1302 can maintain a running balance of assets managed by the service provider of FIG. 12. The ledger(s) of the asset storage 1302 can further indicate some of the running balance for each of the ledger(s) stored in the asset storage 1302 is assigned or registered to one or more user account(s) 1304.

In at least one example, the asset storage 1302 can include transaction logs 1318, which can include records of past transactions involving the service provider of FIG. 12. In at least one example, transaction data, as described herein, can be stored in association with the transaction logs 1318.

In some examples, the data store(s) 1300 can store a private blockchain 1319. A private blockchain 1319 can function to record sender addresses, recipient addresses, public keys, values of cryptocurrency transferred, and/or can be used to verify ownership of cryptocurrency tokens to be transferred. In some examples, the service provider of FIG. 12 can record transactions taking place within the service provider of FIG. 12 involving cryptocurrency until the number of transactions has exceeded a determined limit (e.g., number of transactions, storage space allocation, etc.). Based at least in part on determining that the limit has been reached, the service provider of FIG. 12 can publish the transactions in the private blockchain 1319 to a public blockchain (e.g., associated with the asset network), where miners can verify the transactions and record the transactions to blocks on the public blockchain. In at least one example, the service provider of FIG. 12 can participate as miner(s) at least for its transactions to be posted to the public blockchain.

In at least one example, the data store(s) 1300 can store and/or manage accounts, such as user account(s) 1304, merchant account(s) 1306, and/or customer account(s) 1308. In at least one example, the user account(s) 1304 may store records of user accounts associated with the users 1206. In at least one example, the user account(s) 1304 can include a user account 1320, which can be associated with a user (of the users 1206). Other user accounts of the user account(s) 1304 can be similarly structured to the user account 1320, according to some examples. In other examples, other user accounts may include more or less data and/or account information than that provided by the user account 1320. In at least one example, the user account 1320 can include user account data 1328, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1328 can include account activity 1330 and user wallet key(s) 1332. The account activity 1330 may include a transaction log for recording transactions associated with the user account 1320. In some examples, the user wallet key(s) 1332 can include a public-private key-pair and a respective address associated with the asset network or other asset networks. In some examples, the user wallet key(s) 1332 may include one or more key pairs, which can be unique to the asset network or other asset networks.

In addition to the user account data 1328, the user account 1320 can include ledger(s) for account(s) managed by the service provider of FIG. 12, for the user. For example, the user account 1320 may include an asset ledger 1334, a fiat currency ledger 1336, and/or one or more other ledgers 1338. The ledger(s) can indicate that a corresponding user utilizes the service provider of FIG. 12 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 12.

In some examples, the asset ledger 1334 can store a balance for each of one or more cryptocurrencies (e.g., Bitcoin, Ethereum, Litecoin, etc.) registered to the user account 1320. In at least one example, the asset ledger 1334 can further record transactions of cryptocurrency assets associated with the user account 1320. For example, the user account 1320 can receive cryptocurrency from the asset network using the user wallet key(s) 1332. In some examples, the user wallet key(s) 1332 may be generated for the user upon request. User wallet key(s) 1332 can be requested by the user in order to send, exchange, or otherwise control the balance of cryptocurrency held by the service provider of FIG. 12 (e.g., in the asset wallet 1310) and registered to the user. In some examples, the user wallet key(s) 1332 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 12 and the value is credited as a balance in asset ledger 1334), by purchasing currency in the form associated with the account using currency in a different form (e.g., buying a value of cryptocurrency from the service provider of FIG. 12 using a value of fiat currency reflected in fiat currency ledger 1314, and crediting the value of cryptocurrency in asset ledger 1334), or by conducting a transaction with another user (customer or merchant) of the service provider of FIG. 12 wherein the account receives incoming currency (which can be in the form associated with the account or a different form, in which the incoming currency may be converted to the form associated with the account). In some examples, the user account data 1328 can include preferences for maintaining balances of individual of the ledgers. For example, the service provider of FIG. 12 can automatically debit the fiat currency ledger 1336 to increase the asset ledger 1334, or another account associated with the user whenever the cryptocurrency balance (e.g., of the asset ledger 1334) falls below a stated level (e.g., a threshold). Conversely, in some embodiments, the service provider of FIG. 12 can automatically credit the fiat currency ledger 1336 to decrease the asset ledger 1334 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s)) unrelated to the service provider of FIG. 12 (i.e., an external account). In at least one example, the user can transfer all or a portion of a balance of the cryptocurrency stored in the third-party cryptocurrency wallet to the service provider of FIG. 12. Such a transaction can require the user to transfer an amount of the cryptocurrency in a message signed by user's private key to an address provided by the service provider of FIG. 12. In at least one example, the transaction can be sent to miners to bundle the transaction into a block of transactions and to verify the authenticity of the transactions in the block. Once a miner has verified the block, the block is written to a public, distributed blockchain where the service provider of FIG. 12 can then verify that the transaction has been confirmed and can credit the user's asset ledger 1334 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 12. As described above, in some examples, the service provider of FIG. 12 can acquire cryptocurrency from a third-party source (e.g., associated with the third-party server(s)). In such examples, the asset wallet 1310 can be associated with different addresses and can vary addresses used to acquire cryptocurrency so that its holdings are represented under a variety of addresses on a blockchain. When the service provider of FIG. 12 has their own holdings of cryptocurrency, users can acquire cryptocurrency directly from the service provider of FIG. 12. In some examples, the service provider of FIG. 12 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 12 has its own cryptocurrency assets, cryptocurrency transferred in a transaction (e.g., data with address provided for receipt of transaction and a balance of cryptocurrency transferred in the transaction) can be stored in the asset wallet 1310. In at least one example, the service provider of FIG. 12 can credit the asset ledger 1334 of the user. Additionally, while the service provider of FIG. 12 recognizes that the user retains the value of the transferred cryptocurrency through crediting the asset ledger 1334, any person that inspects the blockchain will see the cryptocurrency as having been transferred to the service provider of FIG. 12. In some examples, the asset wallet 1310 can be associated with many different addresses. In such examples, any person that inspects the blockchain may not easily associate all cryptocurrency stored in asset wallet 1310 as belonging to the same entity. It is this presence of a private ledger that is used for real-time transactions and maintained by the service provider of FIG. 12, combined with updates to the public ledger at other times, that allows for extremely fast transactions using cryptocurrency to be achieved. In some examples, the "private ledger" can refer to the asset ledger 1310, which in some examples, can utilize the private blockchain 1319, as described herein. The "public ledger" can correspond to a public blockchain associated with the asset network.

In at least one example, a user's asset ledger 1334, fiat currency ledger 1336, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1334. In some examples, a user can receive fiat currency or another currency in the form of payment for a transaction with another user. In at least one example, at least a portion of such funds can be converted into cryptocurrency by the service provider of FIG. 12 and used to fund the asset ledger 1334 of the user.

As addressed above, in some examples, users can also have other accounts maintained by the service provider of FIG. 12. For example, a user can also have an account in U.S. dollars, which can be tracked, for example, via the fiat currency ledger 1336. Such an account can be funded by transferring money from a bank account at a third-party bank to an account maintained by the service provider of FIG. 12 as is conventionally known. In some examples, a user can receive fiat currency in the form of payment for a transaction with another user. In such examples, at least a portion of such funds can be used to fund the fiat currency ledger 1336.

In some examples, a user can have one or more internal payment cards registered with the service provider of FIG. 12. Internal payment cards can be linked to one or more of the accounts associated with the user account 1320. In some embodiments, options with respect to internal payment cards can be adjusted and managed using an application (e.g., the payment application 1218).

In at least one example, as described above, each ledger can correspond to an account of the user that is managed by the service provider of FIG. 12. In at least one example, individual of the accounts can be associated with a wallet or a stored balance for use in payment transactions, peer-to-peer transactions, payroll payments, etc.

In at least one example, the user account 1320 can be associated with an asset wallet 1340. The asset wallet 1340 of the user can be associated with account information that can be stored in the user account data 1328 and, in some examples, can be associated with the user wallet key(s) 1332. In at least one example, the asset wallet 1340 can store data indicating an address provided for receipt of a cryptocurrency transaction. In at least one example, the balance of the asset wallet 1340 can be based at least in part on a balance of the asset ledger 1334. In at least one example, funds availed via the asset wallet 1340 can be stored in the asset wallet 1340 or the asset wallet 1310. Funds availed via the asset wallet 1310 can be tracked via the asset ledger 1334. The asset wallet 1340, however, can be associated with additional cryptocurrency funds.

In at least one example, when the service provider of FIG. 12 includes a private blockchain 1319 for recording and validating cryptocurrency transactions, the asset wallet 1340 can be used instead of, or in addition to, the asset ledger 1334. For example, at least one example, a merchant can provide the address of the asset wallet 1340 for receiving payments. In an example where a customer is paying in cryptocurrency and the customer has their own cryptocurrency wallet account associated with the service provider of FIG. 12, the customer can send a message signed by its private key including its wallet address (i.e., of the customer) and identifying the cryptocurrency and value to be transferred to the merchant's asset wallet 1340. The service provider of FIG. 12 can complete the transaction by reducing the cryptocurrency balance in the customer's cryptocurrency wallet and increasing the cryptocurrency balance in the merchant's asset wallet 1340. In addition to recording the transaction in the respective cryptocurrency wallets, the transaction can be recorded in the private blockchain 1319, and the transaction can be confirmed. A user can perform a similar transaction with cryptocurrency in a peer-to-peer transaction as described above. In at least one example, the cryptocurrency wallet account 1330 can be funded by a balance transfer from a third-party cryptocurrency wallet, as described above. Such a transaction can require a user to transfer an amount of cryptocurrency in a message signed by the user's private key to an address of the cryptocurrency wallet account 1330. The transferred amount of cryptocurrency can then be within the cryptocurrency wallet account 1330 for use in later transactions.

While the asset ledger 1334 and/or asset wallet 1340 are each described above with reference to cryptocurrency, the asset ledger 1334 and/or asset wallet 1340 can alternatively be used in association with securities. In some examples, different ledgers and/or wallets can be used for different types of assets. That is, in some examples, a user can have multiple asset ledgers and/or asset wallets for tracking cryptocurrency, securities, or the like. The data stores 1300 may also include a holding account 1342.

It should be noted that user(s) having accounts managed by the service provider of FIG. 12 is an aspect of the technology disclosed that enables technical advantages of increased processing speed and improved security.

Figure 14:
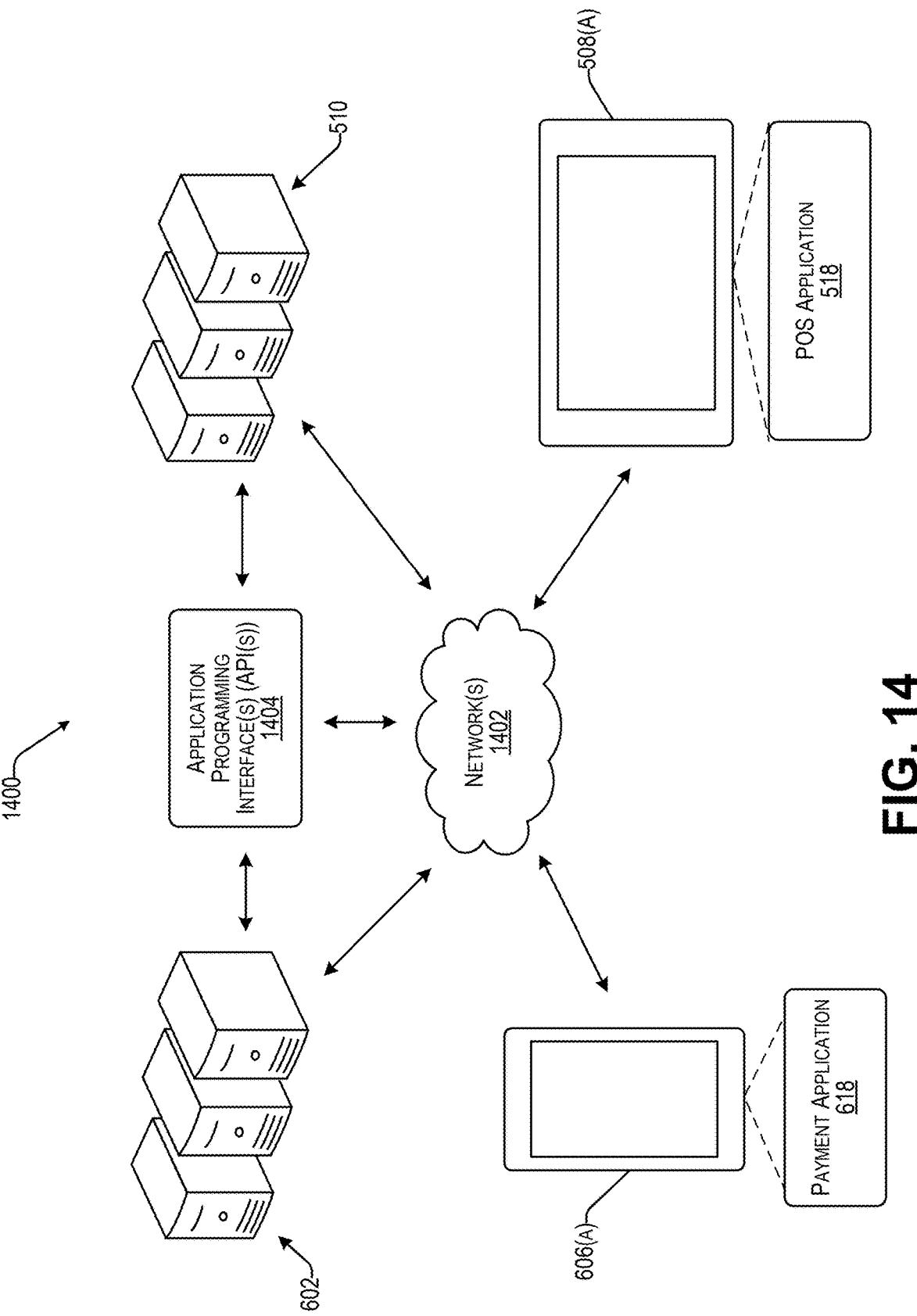
FIG. 14 is an example environment 1400 wherein the environment 1100 and the environment 1300 can be integrated to enable payments at the point-of-sale using assets associated with user accounts in the peer-to-peer environment of FIG. 12, according to an embodiment described herein.

FIG. 14 is an example environment 1400 wherein the environment 1100 and the environment 1300 can be integrated to enable payments at the point-of-sale using assets associated with user accounts in the peer-to-peer environment of FIG. 12, according to an embodiment described herein. As illustrated, each of the components can communicate with one another via one or more networks 1402. In some examples, one or more APIs 1404 or other functional components can be used to facilitate such communication. For example, the APIs 1404 can be used to facilitate communication with payment service server(s) 1202 and server(s) 1210 associated with third-party service provider(s).

In at least one example, the example environment 1400 can enable contactless payments, via integration of peer-to-peer payment, or other payment making, platform(s) and payment processing platform(s), are described herein. For the purpose of FIG. 14, the environment 1100 can refer to a payment processing platform and the environment 1200 can refer to a peer-to-peer payment, or payment making, platform. In an example, such an integration can enable a customer to participate in a transaction via their own computing device instead of interacting with a merchant device of a merchant, such as the merchant device 1108(A). In such an example, the POS application 1118, associated with a payment processing platform and executable by the merchant device 1108(A) of the merchant, can present a Quick Response (QR) code, or other code that can be used to identify a transaction (e.g., a transaction code), in association with a transaction between the customer and the merchant. The QR code, or other transaction code, can be provided to the POS application 1118 via an API associated with the peer-to-peer payment platform. In an example, the customer can utilize their own computing device, such as the user device 1208(A), to capture the QR code, or the other transaction code, and to provide an indication of the captured QR code, or other transaction code, to server(s) 1102 and/or server(s) 1202.

Based at least in part on the integration of the peer-to-peer payment platform and the payment processing platform (e.g., via the API), the server(s) 1102 and/or 1202 associated with each can exchange communications with each other— and with a payment application 1218 associated with the peer-to-peer payment platform and/or the POS application 1118—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1208(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1208(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1118 and the payment application 1218, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1208(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1118, associated with a payment processing platform, on the merchant device 1108(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1108(A) can present a QR code, or other transaction code, that can be associated with a peer-to-peer payment platform. The customer can use a camera associated with the user device 1208(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1118, associated with a payment processing platform, on the merchant device 1108(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1118 can cause a text message with a resource locator (e.g., uniform resource locator (URL)) that can be associated with a peer-to-peer payment platform to be sent to the user device 1208(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer", and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1208 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer", and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1118 of a merchant device 1108(A) at a brick-and-mortar store of a merchant to a payment application 1218 of a user device 1208(A) of a customer to enable the customer to participate in a transaction via their own computing device. For instance, in a "scan to pay" example as described above, based at least in part on capturing the QR code, or other transaction code, via the user device 1208(A), the payment processing platform can provide transaction data to the peer-to-peer payment platform for presentation via the payment application 1218 on the user device 1208(A). In some examples, the customer can watch items being added to their cart (e.g., via a user interface presented via the payment application). As an item is added to a virtual cart by the merchant—via the POS application 1118 on the merchant device 1108(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1218 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1208(A) during or after payment of the transaction.

In some examples, based at least in part on capturing the QR code, or other transaction code, the payment processing platform can provide transaction data to the peer-to-peer payment platform for presentation via the payment application 1218 on the computing device of the customer, such as the user device 1208(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1218 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1118, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1218 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 15:
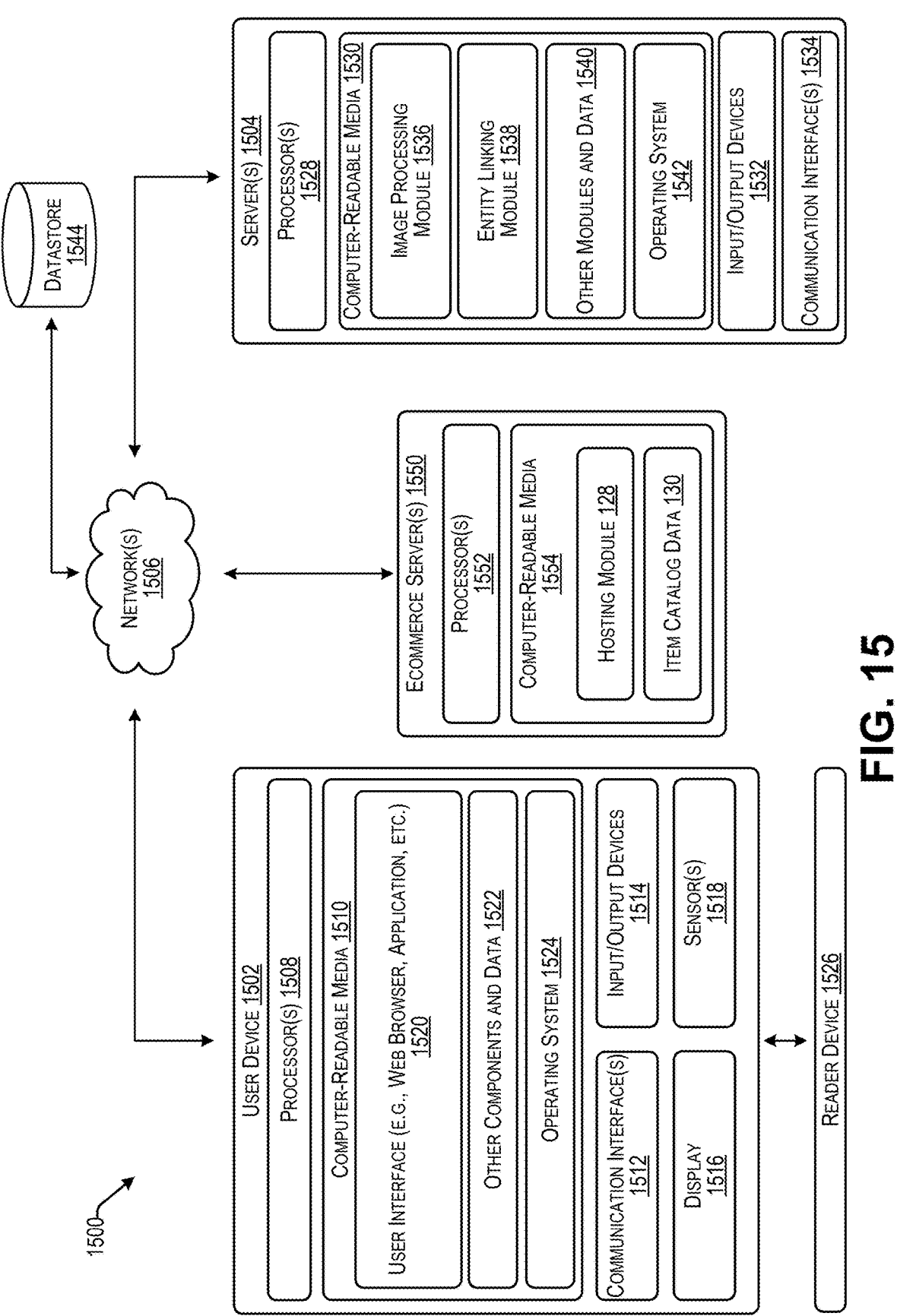
FIG. 15 is an illustrative block diagram illustrating a system for performing techniques described herein, according to an embodiment described herein.

FIG. 15 is an illustrative block diagram illustrating a system for performing techniques described herein, according to an embodiment described herein. The system 1500 includes a user device 1502, that communicates with server computing device(s) (e.g., server(s) 1504) via network(s) 1506 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1502 is illustrated, in additional or alternate examples, the system 1500 can have multiple user devices, as described above with reference to FIG. 15.

In at least one example, the user device 1502 can be any suitable type of computing device, e.g., portable, semi-portable, semi-stationary, or stationary. Some examples of the user device 1502 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1502 can be any computing device capable of sending communications and performing the functions according to the techniques described herein. The user device 1502 can include devices, e.g., payment card readers, or components capable of accepting payments, as described below.

In the illustrated example, the user device 1502 includes one or more processors 1508, one or more computer-readable media 1510, one or more communication interface(s) 1512, one or more input/output (I/O) devices 1514, a display 1516, and sensor(s) 1518.

In at least one example, each processor 1508 can itself comprise one or more processors or processing cores. For example, the processor(s) 1508 can be implemented as one or more microprocessors, microcomputers, microcontrollers, digital signal processors, central processing units, state machines, logic circuitries, and/or any devices that manipulate signals based on operational instructions. In some examples, the processor(s) 1508 can be one or more hardware processors and/or logic circuits of any suitable type specifically programmed or configured to execute the algorithms and processes described herein. The processor(s) 1508 can be configured to fetch and execute computer-readable processor-executable instructions stored in the computer-readable media 1510.

Depending on the configuration of the user device 1502, the computer-readable media 910 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1510 can include, but is not limited to, RAM, ROM, EEPROM, flash memory, solid-state storage, magnetic disk storage, optical storage, and/or other computer-readable media technology. Further, in some examples, the user device 1502 can access external storage, such as RAID storage systems, storage arrays, network attached storage, storage area networks, cloud storage, or any other medium that can be used to store information and that can be accessed by the processor(s) 1508 directly or through another computing device or network. Accordingly, the computer-readable media 1510 can be computer storage media able to store instructions, components or components that can be executed by the processor(s) 1508. Further, when mentioned, non-transitory computer-readable media exclude media such as energy, carrier signals, electromagnetic waves, and signals per se.

The computer-readable media 1510 can be used to store and maintain any number of functional components that are executable by the processor(s) 1508. In some implementations, these functional components comprise instructions or programs that are executable by the processor(s) 1508 and that, when executed, implement operational logic for performing the actions and services attributed above to the user device 1502. Functional components stored in the computer-readable media 1510 can include a user interface 1520 to enable users to interact with the user device 1502, and thus the server(s) 1504 and/or other networked devices. In at least one example, the user interface 1520 can be presented via a web browser, or the like. In other examples, the user interface 1520 can be presented via an application, such as a mobile application or desktop application, which can be provided by a service provider associated with the server(s) 1504, or which can be an otherwise dedicated application. In some examples, the user interface 1520 can be configured to display options for withdrawing funds to make donations. The user interface 1520 may also be configured to surface information about donations. It should be understood that the user interface 1520 can be configured to display, facilitate, or otherwise perform any of the interactions described herein with respect to transactions or other operations as described herein. In at least one example, a user can interact with the user interface via touch input, spoken input, gesture, or any other type of input. The word "input" is also used to describe "contextual" input that may not be directly provided by the user via the user interface 1520. For example, user's interactions with the user interface 1520 are analyzed using, e.g., natural language processing techniques, to determine context or intent of the user, which may be treated in a manner similar to "direct" user input.

Depending on the type of the user device 1502, the computer-readable media 1510 can also optionally include other functional components and data, such as other components and data 1522, which can include programs, drivers, etc., and the data used or generated by the functional components. In addition, the computer-readable media 1510 can also store data, data structures and the like, that are used by the functional components. Further, the user device 1502 can include many other logical, programmatic and physical components, of which those described are merely examples that are related to the discussion herein.

In at least one example, the computer-readable media 1510 can include additional functional components, such as an operating system 1524 for controlling and managing various functions of the user device 1502 and for enabling basic user interactions.

The communication interface(s) 1512 can include one or more interfaces and hardware components for enabling communication with various other devices, such as over the network(s) 1506 or directly. For example, communication interface(s) 1512 can enable communication through one or more network(s) 1506, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1506 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1502 can further include one or more input/output (I/O) devices 1514. The I/O devices 1514 can include speakers, a microphone, a camera, and various user controls (e.g., buttons, a joystick, a keyboard, a keypad, etc.), a haptic output device, and so forth. The I/O devices 1514 can also include attachments that leverage the accessories (audio-jack, USB-C, Bluetooth, etc.) to connect with the user device 1502.

In at least one example, user device 1502 can include a display 1516. Depending on the type of computing device(s) used as the user device 1502, the display 1516 can employ any suitable display technology. For example, the display 1516 can be a liquid crystal display, a plasma display, a light emitting diode display, an OLED (organic light-emitting diode) display, an electronic paper display, or any other suitable type of display able to present digital content thereon. In at least one example, the display 1516 can be an augmented reality display, a virtually reality display, or any other display able to present and/or project digital content. In some examples, the display 1516 can have a touch sensor associated with the display 1516 to provide a touchscreen display configured to receive touch inputs for enabling interaction with a graphic interface presented on the display 1516. Accordingly, implementations herein are not limited to any particular display technology. Alternatively, in some examples, the user device 1502 may not include the display 1516, and information can be presented by other means, such as aurally, haptically, etc.

In addition, the user device 1502 can include sensor(s) 1518. The sensor(s) 1518 can include a GPS device able to indicate location information. Further, the sensor(s) 1518 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider 1524, described above, to provide one or more services. That is, in some examples, the service provider 1524 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1514 and/or for sending users 1514 notifications regarding available appointments with merchant(s) located proximate to the users 1514. In at least one example, location can be used for taking payments from nearby customers when they leave a geofence, or location can be used to initiate an action responsive to users 1514 enter a brick-and-mortar store of a merchant. Location can be used in additional or alternative ways as well.

Additionally, the user device 1502 can include various other components that are not shown, examples of which include removable storage, a power source, such as a battery and power control unit, a barcode scanner, a printer, a cash drawer, and so forth.

In addition, in some examples, the user device 1502 can include, be connectable to, or otherwise be coupled to a reader device 1526, for reading payment instruments and/or identifiers associated with payment objects. In some examples, as described above, the reader device 1526 can plug in to a port in the user device 1502, such as a microphone port, a headphone port, an audio-jack, a data port, or other suitable port. In additional or alternative examples, the reader device 1526 can be coupled to the user device 1502 via another wired or wireless connection, such as via a Bluetooth®, BLE, and so on. The reader device 1526 can include a read head for reading a magnetic strip of a payment card, and further can include encryption technology for encrypting the information read from the magnetic strip. Additionally or alternatively, the reader device 1526 can be an EMV payment reader, which in some examples, can be embedded in the user device 1502. Moreover, numerous other types of readers can be employed with the user device 1502 herein, depending on the type and configuration of the user device 1502.

The reader device 1526 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1526 may include hardware implementation, such as slots, magnetic tracks, and rails with one or more sensors or electrical contacts to facilitate detection and acceptance of a payment instrument. That is, the reader device 1526 may include hardware implementations to enable the reader device 1526 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally, or optionally, the reader device 1526 may also include a biometric sensor to receive and process biometric characteristics and process them as payment instruments, given that such biometric characteristics are registered with the payment service 104 and connected to a financial account with a bank server.

The reader device 1526 may include processing unit(s), computer-readable media, a reader chip, a transaction chip, a timer, a clock, a network interface, a power supply, and so on. The processing unit(s) of the reader device 1526 may execute one or more components and/or processes to cause the reader device 1526 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1526, the computer-readable media may include volatile memory (such as RAM), non-volatile memory (such as ROM, flash memory, miniature hard drive, memory card, or the like), or some combination thereof. In at least one example, the computer-readable media of the reader device 1526 may include at least one component for performing various functions as described herein.

The reader chip may perform functionalities to control the operations and processing of the reader device 1526. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1512, which may provide a clock signal indicating a time. Furthermore, the reader chip may perform functionality to control the network interface, which may interface with the network(s) 1506, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1526. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1502, which can be a POS terminal, and the reader device 1526 are shown as separate devices, in additional or alternative examples, the user device 1502 and the reader device 1526 can be part of a single device, which may be a battery-operated device. In such an example, components of both the user device 1502 and the reader device 1526 may be associated with the single device. In some examples, the reader device 1526 can have a display integrated therewith, which can be in addition to (or as an alternative of) the display 1516 associated with the user device 1502.

The server(s) 1504 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1504 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1504 can be located together or separately, and organized, for example, as virtual servers, server banks and/or server farms. The described functionality can be provided by the servers of a single merchant or enterprise or can be provided by the servers and/or services of multiple different customers or enterprises.

In the illustrated example, the server(s) 1504 can include one or more processors 1528, one or more computer-readable media 1530, one or more I/O devices 1532, and one or more communication interfaces 1534. Each processor 1528 can be a single processing unit or a number of processing units and can include single or multiple computing units or multiple processing cores. The processor(s) 1528 can be implemented as one or more microprocessors, microcomputers, microcontrollers, digital signal processors, central processing units, state machines, logic circuitries, and/or any devices that manipulate signals based on operational instructions. For example, the processor(s) 1528 can be one or more hardware processors and/or logic circuits of any suitable type specifically programmed or configured to execute the algorithms and processes described herein. The processor(s) 1528 can be configured to fetch and execute computer-readable instructions stored in the computer-readable media 1530, which can program the processor(s) 1528 to perform the functions described herein.

The computer-readable media 1530 can include volatile and nonvolatile memory and/or removable and non-removable media implemented in any type of technology for storage of information, such as computer-readable instructions, data structures, program components, or other data. Such computer-readable media 1530 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1504, the computer-readable media 1530 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1530 can be used to store any number of functional components that are executable by the processor(s) 1528. In many implementations, these functional components comprise instructions or programs that are executable by the processors 1528 and that, when executed, specifically configure the one or more processors 1528 to perform the actions attributed above to the service provider and/or payment processing service. Examples of functional components that may be included in the computer-readable media 1530 can include an image processing module 1536, an entity linking module 1538, and any number of other modules and data 1540.

The image processing module 1536 may use one or more computer vision techniques to identify a number of object representations throughout the raw data. Such an object representation may be any representation of a character or item depicted within the raw data. Examples of computer vision techniques that may be used to identify objects include optical character recognition (OCR) or other methods of object recognition. Using the computer vision techniques, the image processing module 1536 may be configured to identify individual text characters throughout the raw data. In some cases, the image processing module 1536 may be further configured to determine characteristics of the characters, such as a font style, font size, and/or font color associated with the character. Additionally, locations may be determined in relation to each identified character within the raw data. In some cases, a bounding box may be created for each identified character that contains that character. In some cases, a bounding box may be defined as a location of a point in the bounding box (e.g., the top leftmost corner) and a height and width of the bounding box.

An entity linking module 1538 may receive information about each of the identified objects within the raw data and may determine a number of entity groupings based on that information. In embodiments, the objects may be grouped into an entity based on proximity in locations of each of the objects, a style common to those objects, or any other detected similarities between the objects. In embodiments, bounding boxes may be generated to contain each entity formed in this manner. In some embodiments, the information about the detected/grouped objects is provided to a trained ML model in order to generate one or more entity labels to be applied to each entity (grouping of objects). An entity that has been assigned an entity label may be referred to as an object category.

The other components may include a training component that can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1502 and/or the server(s) 1504 for use at a time after the data models have been trained (e.g., at runtime).

The other modules and data 1540 can include programs, drivers, etc., and the data used or generated by the functional components. Further, the server(s) 1504 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally, or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1530 can additionally include an operating system 1542 for controlling and managing various functions of the server(s) 1504.

The communication interface(s) 1534 can include one or more interfaces and hardware components for enabling communication with various other devices, such as over the network(s) 1506 or directly. For example, communication interface(s) 1534 can enable communication through one or more network(s) 1506, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1502 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1504 can further be equipped with various I/O devices 1532. Such I/O devices 1532 can include a display, various user interface controls (e.g., buttons, joystick, keyboard, mouse, touch screen, biometric or sensory input devices, etc.), audio speakers, connection ports and so forth.

In at least one example, the system 1500 can include a datastore 1544 that can be configured to store data that is accessible, manageable, and updatable. In some examples, the datastore 1544 can be integrated with the user device 1502 and/or the server(s) 1504. In other examples, as shown in FIG. 15, the datastore 1544 can be located remotely from the server(s) 1504 and can be accessible to the server(s) 1504. The datastore 1544 can comprise multiple databases and/or servers connected locally and/or remotely via the network(s) 1506.

In at least one example, the datastore 1544 can store user profiles, which can include merchant profiles, customer profiles, and so on. In some examples, the datastore(s) 1544 can store user profiles of customers, merchants, the payment service, etc., as described herein. In some examples, such user profiles can be associated with one or more user accounts.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 1212.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1544 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1544 can store additional or alternative types of data as described herein.

In some embodiments, the environment of FIG. 15 may further include one or more eCommerce Servers 1550. The eCommerce server(s) 1550 can include any suitable servers or other types of computing devices that can be configured to provide ecommerce services as described herein. Like the servers 1504 as described above, the ecommerce servers 1150 may include processor(s) 1552 and a computer-readable media 1554. As noted elsewhere, the computer readable media 1554 may include a hosting module 128 and an item catalog 130 as described with respect to FIG. 1 above.

FIG. 16 is a flow chart that illustrates a process for generating a first digital document from an original document according to an embodiment described herein. Particularly, the process 1600 is focused primarily on generating an item catalog on a website based on data presented on a different website. Such a process may be useful for a user that, for example, wishes to transfer or replicate his or her item catalog on a website hosted by a platform that doesn't use the same format as the original item catalog.

At 1602, the process 1600 may involve receiving an address (e.g., a URL) or other suitable indication of a location of data to be converted into a digital version of that data. A webpage is then accessed at the received location. A webpage is typically a formatted document hosted at a particular network address that may be accessed using an application (e.g., using a browser application).

At 1604, the process 1600 may involve making a determination as to whether the website data is already cached. Particularly, the process may involve checking a repository of cache data 1618 maintained with respect to websites that have already been processed. In some cases, if cached data is identified within the cache data 1618, then a further determination may be made as to whether the webpage has been updated since the cached data has been generated. This may involve comparing a date/time at which the cache data was generated to a date/time at which the webpage was last updated. If the cache data exists, and if that cache data is updated, then the process may proceed to 1614.

If the cache data does not exist, of if that cache data is not updated, then the process may proceed to 1614, then at 1606, the process 1600 may involve indexing one or more webpages located at the received address. To do this, the process may consult a sitemap (e.g., a robot.txt file). A robots.txt file is a plain text file that specifies whether or not a crawler should or shouldn't access specific folders, subfolders or pages, along with other information about a webpage. The robots.txt file uses the Robots Exclusion Standard, a protocol set in 1994 for websites to communicate with crawlers and other bots. The robots.txt file is typically used to indicate to bots what subpages an owner of the webpage does or does not give permission to scrape. In addition, the robots.txt file will typically include a location for an XML file called sitemap.xml which includes a list of subpage URLS can be scraped. The sitemap.xml can also point to other XML files indicating the structure of how the website is organized. Using these files, each of the webpages at a specified domain can be indexed.

In the case that the domain does not use a robots.txt file, a web crawler may be used to index the webpages on the domain. Such a web crawler has a spider web structure generated by scraping the main page of the domain first, continuing to identify HTML A Tags for subpage URLS for each scraped page, and adding those new URLS to pages to explore until no more new subpage URLS are discovered. This logic adopts a breadth-first search (BFS) approach and avoids duplicate pages as previous pages (nodes) will be marked as "visited" and will not be added to the list of unexplored URLS.

At 1608, the process 1600 may involve identifying, within the indexed webpages, one or more pages that are catalog or product pages. To do this, the system may implement heuristics to classify the pages into irrelevant pages such as "Contact Us", "History", catalog pages, and product pages. More particularly, the system may break up the URL into bags of words to scan for catalog-related vocabulary or product-related vocabulary to classify the URL. For example, in the case of catalog pages, phrases such as "collections", "shop all", "shop", "menu" occur frequently. For product pages, the mention of "product" and long strings of product description may indicate that the webpage is a product page.

At 1610, the process 1600 may involve parsing each of the identified product pages to locate images and/or textboxes. Each of the indexed webpages may contains text and images. To parse those text and images, the system can render the webpage (e.g., using a browser application) and then parse the webpage for any tags that contain navigable strings. Once the tags with text are identified, then the system may query the coordinate boxes of each character and each word on the page. Similar to how the webpage is parsed for text, the webpage may also be parsed for image data. However, in addition to obtaining the location of the images, the system may also obtain an alt attribute of those images to be used in training machine learning models. In some cases, an "image" label is added to an entity representing an image corresponding to a bounding box. In some cases, that entity may be further associated with a text description of the image, which may be obtained using object recognition or from metadata associated with the image.

In some embodiments, the process 1600 may further involve breaking a webpage (or subpage) into sections. During the previously described process, the system may be configured to parse standard sized pages (e.g., pages of PDFs) and hence may accept coordinates that are within the aspect ratio of the size of a letter printing paper. However, an entire webpage (or subpage) can be lengthy and there may be a need to divide the webpage into multiple sections in order to reduce computation needed for each section. In such cases, the system may initially divide the webpage into sections based on a ratio of $1:1/\sqrt{2}$ and then based on the coordinate boxes identified with respect to images and/or text in order to adjust the cutoff to where the cutoff line will not cut through any boxes.

At 1612, the process 1600 may involve performing the process 200 as described elsewhere. In that process, each of the webpages identified as being product pages may be presented at an original document, for which a digital version may be generated as a second webpage.

At 1614, the process 1600 may involve generating or updating a webpage by exporting the entities identified via the process performed at 1612. In some cases, the entities identified via the process performed at 1612 at stored in cache data 1618.

At 1616, the process 1600 may involve responding to the request by providing either the identified entities (e.g., to be used to update a current webpage) or by providing a generated webpage.

The phrases "in some examples," "according to various examples," "in the examples shown," "in one example," "in other examples," "various examples," "some examples," and the like generally mean the particular feature, structure, or characteristic following the phrase is included in at least one example of the present invention and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above-described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A system comprising:
one or more processors; and
non-transitory computer-readable media storing instructions that, when executed by the one or more processors, cause the one or more processors to perform operations comprising:
receiving an image of an original document associated with a user, wherein the original document is a physical document;
identifying one or more object categories within the original document, wherein the object categories are grouped to be associated with items depicted in the original document, and wherein identifying the one or more object categories is based at least in part on application of a machine learning model;
extracting one or more data values associated with the items depicted in the original document from the one or more object categories;
generating document data as a digital version of the original document based on the one or more data values associated with the items depicted in the original document; and
providing the document data to at least one user device to be presented via a user interface.

2. The system of claim 1, the operations further comprising:
generating, in the digital version of the original document, at least one interactive element associated with an action to be performed with respect to at least one item.

3. The system of claim 1, the operations further comprising grouping the object categories to be associated with items based on a relative position and style of the object categories.

4. The system of claim 1, wherein the image of the original document is captured using a user device associated with the user.

5. The system of claim 1, the operations further comprising performing a web crawl operation, wherein the image of the original document is obtained from a website.

6. The system of claim 5, the operations further comprising generating a second website as document data, the second website hosted on an ecommerce platform.

7. The system of claim 6, wherein the ecommerce platform is different from a second ecommerce platform on which the website is hosted.

8. The system of claim 1, wherein an object category of the one or more object categories comprises a name, a title, a description, or a price.

9. The system of claim 1, the operations further comprising:
updating one or more variables or weights used by the machine learning model based on feedback associated with correctness of an identified object category.

10. A method comprising:
receiving an image of an original document associated with a user, wherein the original document is a physical document;
identifying one or more object categories within the original document, wherein the object categories are grouped based on items depicted in the original document, and wherein identifying the one or more object categories is based at least in part on application of a machine learning model;
extracting one or more data values associated with the items depicted in the original document from the one or more object categories;
generating document data as a digital version of the original document based on the one or more data values associated with the items depicted in the original document; and
providing the document data to at least one user device to be presented via a user interface.

11. The method of claim 10, further comprising generating at least one interactive element to be included in the document data, the at least one interactive element capable of being interacted with via the user interface.

12. The method of claim 11, further comprising:
receiving an indication of a selection of the at least one interactive element, wherein the at least one interactive element is associated with at least one item of the items depicted in the original document; and
executing, based on the indication, an action related to the at least one item.

13. The method of claim 10, further comprising associating the items depicted in the original document with a type category based on a relative position of the items within the original document.

14. The method of claim 10, further comprising storing the one or more data values associated with the items depicted in the original document in a database.

15. The method of claim 10, further comprising generating, using one or more machine learning techniques using textual information related to the one or more object categories, at least one image to be included in the document data.

16. The method of claim 10, wherein the original document is obtained from (i) a document capture using a user device associated with the user, (ii) a document provided by the user, or (iii) a website in response to performing a web crawl operation, and further comprising:

generating a second website as document data, the second website hosted on an ecommerce platform, wherein the ecommerce platform is different from a second ecommerce platform on which the website is hosted;

associating the items depicted in the original document with a type category based on a relative position and style of the items within the original document;

storing the one or more data values associated with the items depicted in the original document in a database;

generating, using one or more machine learning techniques using textual information related to the one or more object categories, at least one image to be included in the document data;

generating at least one interactive element to be included in the document data, the at least one interactive element capable of being interacted with via the user interface;

receiving an indication of a selection of the at least one interactive element, wherein the at least one interactive element is associated with at least one item of the items depicted in the original document; and executing, based on the indication, an action related to the at least one item.

17. One or more non-transitory computer-readable media storing instructions that, when executed, cause one or more processors to perform operations comprising:

receiving an image of an original document associated with a user, wherein the original document is a physical document;

identifying one or more object categories within the original document, wherein the object categories are grouped to be associated with items depicted in the original document, and wherein identifying the one or more object categories is based at least in part on application of a machine learning model;

extracting one or more data values associated with the items depicted in the original document from the one or more object categories;

generating document data as a digital version of the original document based on the one or more data values associated with the items depicted in the original document; and providing the document data to at least one user device to be presented via a user interface.

18. The one or more non-transitory computer-readable media of claim 17, the operations further comprising:

generating, in the digital version of the original document, at least one interactive element associated with an action to be performed with respect to at least one item.

19. The one or more non-transitory computer-readable media of claim 17, the operations further comprising grouping the object categories to be associated with items based on a relative position and style of the object categories.

20. The one or more non-transitory computer-readable media of claim 17, the operations further comprising:

performing a web crawl operation, wherein the image of the original document is obtained from a website; and generating a second website as document data, the second website hosted on an ecommerce platform.

* * * * *